United States Patent
Kim et al.

(10) Patent No.: US 11,494,027 B2
(45) Date of Patent: Nov. 8, 2022

(54) TOUCH DISPLAY DEVICE AND TOUCH SENSING METHOD

(71) Applicant: LG Display Co., Ltd., Seoul (KR)

(72) Inventors: Jongsung Kim, Gyeonggi-do (KR); HyungUk Jang, Gyeonggi-do (KR); YoungGyu Kim, Gyeonggi-do (KR); NamYong Gong, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/492,234

(22) Filed: Oct. 1, 2021

(65) Prior Publication Data
US 2022/0171514 A1  Jun. 2, 2022

(30) Foreign Application Priority Data
Dec. 2, 2020  (KR) .................. 10-2020-0166544

(51) Int. Cl.
*G06F 3/041* (2006.01)
*G06F 3/044* (2006.01)
*G06F 3/0354* (2013.01)
*G06F 3/038* (2013.01)

(52) U.S. Cl.
CPC .......... *G06F 3/04162* (2019.05); *G06F 3/038* (2013.01); *G06F 3/03545* (2013.01); *G06F 3/0412* (2013.01); *G06F 3/0442* (2019.05); *G06F 3/04166* (2019.05); *G06F 2203/04106* (2013.01)

(58) Field of Classification Search
CPC ............. G06F 3/04162; G06F 3/04166; G06F 3/0442; G06F 3/03545; G06F 3/038; G06F 3/0412; G06F 2203/04106
See application file for complete search history.

(56) References Cited

U.S. PATENT DOCUMENTS

| | | | |
|---|---|---|---|
| 2016/0253041 A1* | 9/2016 | Park | G06F 3/0445 345/174 |
| 2019/0235858 A1* | 8/2019 | Xie | G06F 8/71 |
| 2021/0373731 A1* | 12/2021 | Yeh | G06F 3/0441 |

\* cited by examiner

*Primary Examiner* — Peter D McLoone
(74) *Attorney, Agent, or Firm* — Birch, Stewart, Kolasch & Birch, LLP

(57) ABSTRACT

Discussed is a touch display device and a touch sensing method. More particularly, according to the number of pens that have been paired, the frame can be reconfigured by changing the type of all or part of the multiple touch time periods in the frame, and it is possible to provide high-speed pen search and pen pairing by designing a highly scalable pen protocol to flexibly change the pen mode.

23 Claims, 27 Drawing Sheets

*FIG.9*

| TP | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Config. | B | P | P | P | P | T | T | T | T | P | P | P | P | F | F | F |

FIG.10

| TP Type | Panel Driving Signal | Pen Signal |
|---|---|---|
| B | Beacon Signal | |
| P | DC | 2nd Type |
| T | DC | 1st Type |
| F | TDS | |

FIG.15

| TP Type | Panel Driving Signal | Pen Signal |
|---|---|---|
| B | Beacon Signal | |
| P | DC | 2nd Type |
| T | DC | 1st Type |
| S | DC | 1st Type |
| F | TDS | |

FIG.17

Legend:
- ▦ TP allocated by changing pen-related period (T, P) to pen search period (S)
- ▨ TP allocated by changing finger touch sensing period (F) to pen search period (S)

| Number of pairing-completed pens | Paired slot | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| | | B | P | P | P | P | T | T | T | T | P | P | P | P | F | F | F |
| 0 | 0000 | | | | | | | | | | | | | | | | |
| 1 | 1000 | | | | | | | | | | | | | | | | |
| 1 | 0100 | | | | | | | | | | | | | | | | |
| 1 | 0010 | | | | | | | | | | | | | | | | |
| 1 | 0001 | | | | | | | | | | | | | | | | |
| 2 | 0011 | | | | | | | | | | | | | | | | |
| 2 | 0101 | | | | | | | | | | | | | | | | |
| 2 | 1001 | | | | | | | | | | | | | | | | |
| 2 | 0110 | | | | | | | | | | | | | | | | |
| 2 | 1010 | | | | | | | | | | | | | | | | |
| 2 | 1100 | | | | | | | | | | | | | | | | |
| 3 | 0111 | | | | | | | | | | | | | | | | |
| 3 | 1011 | | | | | | | | | | | | | | | | |
| 3 | 1101 | | | | | | | | | | | | | | | | |
| 3 | 1110 | | | | | | | | | | | | | | | | |

FIG.18

| Number of pairing-completed pens | Paired slot | TP | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| | | B | P | P | P | T | P | P | F | F | P | P | T | P | P | P | F |
| 0 | 0000 | | | | | | | | | | | | | | | | |
| 1 | 1000 | | | | | | | | | | | | | | | | |
| | 0100 | | | | | | | | | | | | | | | | |
| 2 | 1100 | | | | | | | | | | | | | | | | |

☐ TP allocated by changing pen-related period (T, P) to pen search period (S)

▨ TP allocated by changing finger touch sensing period (F) to pen search period (S)

*FIG.19*

| | | TP | | | | | | | | | | | | | | | |
|---|---|---|---|---|---|---|---|---|---|---|---|---|---|---|---|---|---|
| Number of pairing-completed pens | Paired slot | 1 | 2 | 3 | 4 | 5 | 6 | 7 | 8 | 9 | 10 | 11 | 12 | 13 | 14 | 15 | 16 |
| | | B | P | P | P | F | P | T | P | F | P | P | P | F | P | T | P |
| 0 | 0000 | | | | | | | | | | | | | | | | |
| 1 | 1000 | | | | | | | | | | | | | | | | |

☐ TP allocated by changing pen-related period (T, P) to pen search period (S)

▨ TP allocated by changing finger touch sensing period (F) to pen search period (S)

FIG.20A

1 Pen Mode → 2 Pen Mode

| LHB | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Config. | B | P | P | P | P | T | P | P | F | F | P | P | T | P | P | P | F |
| Non-Pair Pen | MCHG | – | ID Hash | – | – | ID Hash | – | ID Hash | Tone | Tone | – | ID Hash | – | – | – | ID Hash | Tone |
| Mute | | | | | | | | | | | | | | | | | |

FIG.20B

1 Pen Mode → 4 Pen Mode & 2 Pen Mode → 4 Pen Mode

| LHB | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Config. | B | P | P | P | ID Hash | ID Hash | T | T | T | T | P | P | P | P | F | F | F |
| Non-Pair Pen | MCHG | - | - | - | - | - | - | ID Hash | ID Hash | - | - | ID Hash | ID Hash | Tone | Tone | Tone |
| Mute | | | | | | | | | | | | | | | | | |

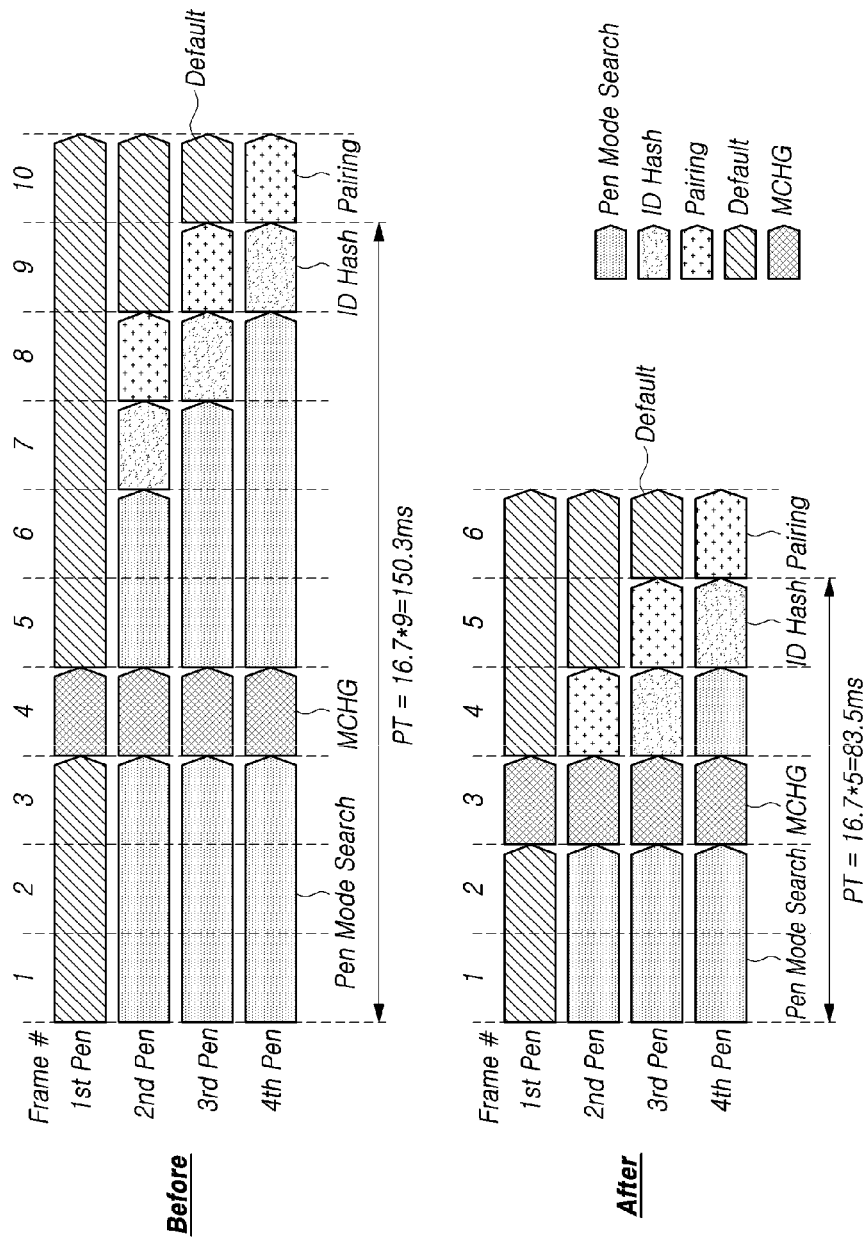

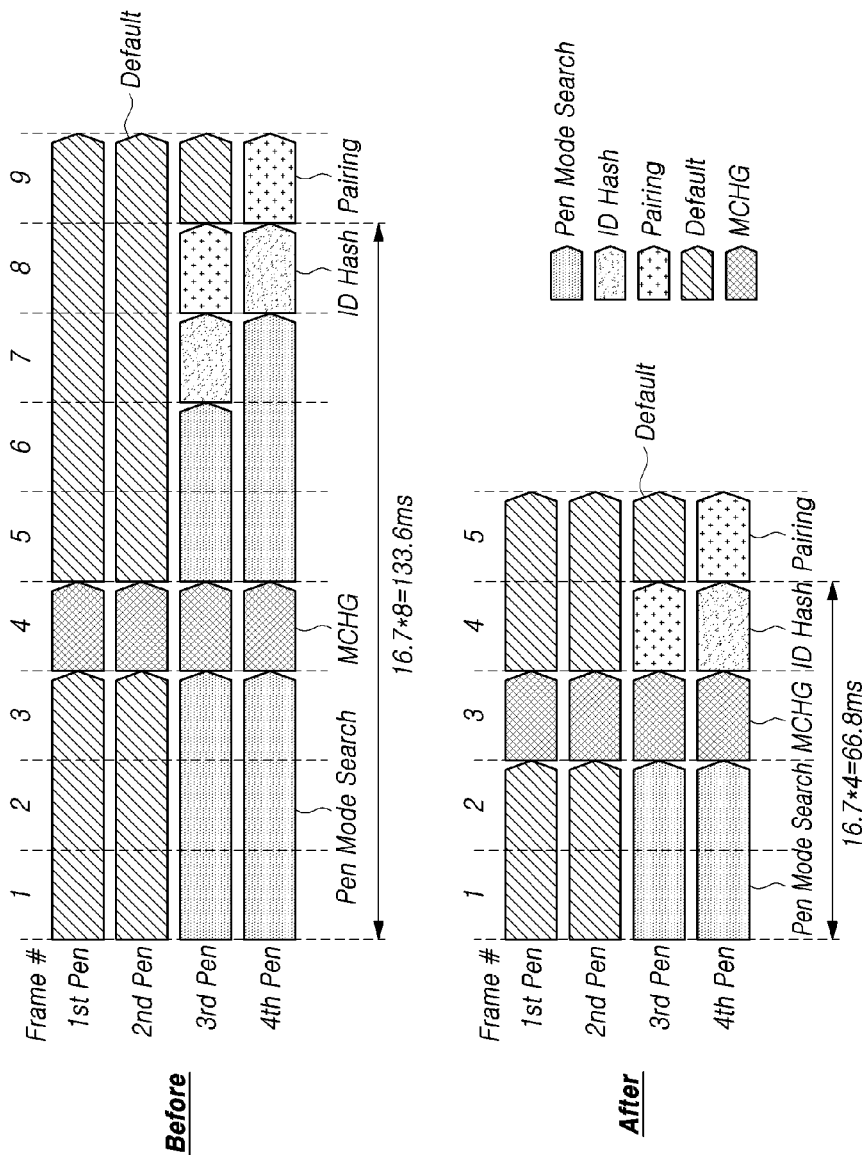

TOUCH DISPLAY DEVICE AND TOUCH SENSING METHOD

CROSS REFERENCE TO RELATED APPLICATION

This application claims priority to Korean Patent Application No. 10-2020-0166544, filed in the Republic of Korea on Dec. 2, 2020, the entire contents of which are hereby expressly incorporated by reference for all purposes as if fully set forth herein into the present application.

BACKGROUND

Technical Field

The present disclosure relates to a touch display device and a touch sensing method.

Description of the Related Art

As the information society develops, the demand for display devices for displaying images is increasing in various forms. Various types of display devices such as a liquid crystal display device (LCD) and an organic light emitting display device (OLED) have been used for this purpose.

Among these display devices, there is a touch display device capable of providing a touch-based input method which allows a user to easily and intuitively input information or commands instead of using input methods such as buttons, keyboards, and mouse.

In addition to fingers and the like, development of a pen touch technology is also being discussed in accordance with the increasing demand for pen touch input. However, in order to be able to process an input for a pen touch, a touch display device may need to be able to quickly recognize the occurrence of a new pen when a new pen approaches and to be in a state capable of sensing the touch input of the new pen. However, when a new pen approaches, there has been a limitation in that the new pen may not be quickly searched, and a limitation in which pairing with a searched new pen may not be quickly processed.

SUMMARY OF THE DISCLOSURE

Embodiments of the present disclosure can provide a touch display device and a touch senjsing method capable of searching a pen at high speed.

Embodiments of the present disclosure can provide a touch display device and a touch senjsing method capable of high-speed pen pairing Embodiments of the present disclosure can provide a touch display device and a touch senjsing method capable of reconfiguring a frame by changing the type of all or part of the plurality of touch time periods in the frame depending on the number of pens that have been paired.

Embodiments of the present disclosure can provide a touch display device and a touch senjsing method designed with highly scalable pen protocol to flexibly change the pen mode.

An aspect of the present disclosure can provide a touch display device including a touch sensor with a plurality of touch electrodes, and a touch sensing circuit which senses the plurality of touch electrodes during a first frame time and senses the plurality of touch electrodes during a second frame time different from the first frame time.

Each of the first frame time and the second frame time can include m touch time periods. In this case, m can be a natural number greater than or equal to 2.

During an arbitrary first touch time period among the m touch time periods of each of the first frame time and the second frame time, the touch sensing circuit can supply a beacon signal to the plurality of touch electrodes.

A first type of pen signal can be applied to at least one touch electrode during the other touch time period different from the first touch time period within the first frame time.

The type of other touch time period within the second frame time can be changed according to a change in the number of pens which have been paired between the first frame time and the second frame time. In addition, during the other touch time period with changed type within the second frame time, the first type of pen signal can be applied to at least one touch electrode, or a second type of pen signal different from the first type can be applied to at least one touch electrode, or a touch driving signal output from the touch sensing circuit can be applied to at least one touch electrode.

As the number of pens which have been paired between the first frame time and the second frame time increases, during the other touch time period with the changed type within the second frame time, the second type of pen signal different from the first type can be applied to at least one touch electrode, or the touch driving signal output from the touch sensing circuit can be applied to at least one touch electrode.

During the other touch time period with the changed type within the second frame time, when the second type of pen signal is applied to at least one touch electrode, the touch sensing circuit can supply the same DC voltage to the plurality of touch electrodes.

The first type of pen signal can be a periodic pulse signal, and the second type of pen signal can be a non-periodic and information-expressed pulse signal.

During the other touch time period with the changed type within the second frame time, when the first type of pen signal is output from a new pen and applied to at least one touch electrode, the touch sensing circuit can recognize the new pen based on the first type of pen signal and perform a pairing process with the new pen.

The touch sensing circuit can perform the pairing process with the new pen by receiving an ID from the new pen through at least one touch electrode and transmitting an ID hash value to the new pen through at least one touch electrode.

During the other touch time period with the changed type within the second frame time, when the first type of pen signal is output from a pen that has already been paired and is applied to at least one touch electrode, the touch sensing circuit can recognize a tilt of the pen based on the first type of pen signal.

During the other touch time period with the changed type within the second frame time, when the second type of pen signal is output from a pen that has already been paired and is applied to at least one touch electrode, the touch sensing circuit can recognize a position of the pen and recognize data including pen information about the pen based on the second type of pen signal. In this case, in a frame time prior to the second frame time, the pen can be a pen that has been paired.

During the other touch time period with the changed type within the second frame time, when the touch driving signal output from the touch sensing circuit is applied to at least one touch electrode, the touch sensing circuit can detect a position of a finger touch based on a change in capacitance in the touch electrode to which the touch driving signal is applied.

The touch sensing circuit can sequentially select a plurality of multiplexing driving groups including a plurality of touch electrodes among the plurality of touch electrodes, and can simultaneously drive the plurality of touch electrodes included in the selected multiplexing driving group. The touch sensing circuit can drive touch electrodes included in at least four multiplexing driving groups among the plurality of multiplexing driving groups for all or part(a pen-related period including a pen position and data sensing period and a pen tilt sensing period) of the m touch time periods.

During the first touch time period of each of the first frame time and the second frame time, the touch sensing circuit can supply the beacon signal as a signal of the same type to the plurality of touch electrodes.

In the case that the beacon signal includes mode conversion information, during a frame time in which the beacon signal is transmitted, the touch sensing circuit can receive a pen signal including an ID from a pen that is not paired with the touch display device through at least one of the touch electrodes, and can transmit an ID hash value to the pen.

In the case that the beacon signal includes mode conversion information, the touch sensing circuit can increase the number of pens that can be paired. The touch sensing circuit can change the type of one or more touch time periods among the m touch time periods in order to increase the number of pens that can be paired. During the touch time period with changed type, the first type of pen signal can be applied to at least one touch electrode, the second type of pen signal different from the first type can be applied to at least one touch electrode, or the touch driving signal output from the touch sensing circuit can be applied to at least one touch electrode.

The mode conversion information is information for converting from one pen mode to another pen mode among a plurality of pen modes according to the number of pens that can be sensed during one touch frame time, and the plurality of pen modes can include a single pen mode for sensing one pen, a double pen mode for sensing two pens, and a multi pen mode for sensing three or more pens.

The touch display device can include a display panel including the touch sensor embedded therein and including a plurality of data lines and a plurality of gate lines, a data driving circuit for supplying data signals for image display to the plurality of data lines during a non-touch time period between two touch time periods, and a gate driving circuit for supplying a scan signal to at least one of the plurality of gate lines during the non-touch time period between two touch time periods.

An aspect of the present disclosure can provide a touch sensing method of a touch display device including supplying, by a touch sensing circuit, a control signal to a plurality of touch electrodes during a first touch time period within a first frame time; receiving, by the touch sensing circuit, a first type of pen signal applied to at least one of the plurality of touch electrodes during the other touch time period different from the first touch time period within the first frame time; supplying, by a touch sensing circuit, a control signal to the plurality of touch electrodes during a first touch time period within a second frame time; and receiving, by the touch sensing circuit, during the other touch time period different from the first touch time period within the second frame time, the first type of pen signal applied to at least one of the plurality of touch electrodes, or receiving a second type of pen signal applied to at least one of the plurality of touch electrodes, or supplying a touch driving signal to at least one of the plurality of touch electrodes.

As the number of pens which have been paired between the first frame time and the second frame time increases, during the other touch time period with the changed type, the second type of pen signal different from the first type can be applied to at least one touch electrode, or the touch driving signal output from the touch sensing circuit can be applied to at least one touch electrode.

An aspect of the present disclosure can provide a touch display device including a plurality of gate lines, a plurality of data lines, and a plurality of subpixels on a substrate, and a touch electrode which is disposed on the substrate, and to which a beacon signal, a constant voltage signal, and a touch driving signal for detecting a finger touch are applied at different timings during one frame time.

In the touch display device according to embodiments of the present disclosure, a period in which the constant voltage signal is applied can include a pen-related period including at least one of a pen position and data sensing period for sensing a pen position and pen information based on a pen signal applied to the touch electrode from the outside, and a pen tilt sensing period for sensing a pen tilt based on the pen signal.

The remaining periods excluding the pen-related period among the periods in which the constant voltage signal (e.g., DC voltage) is applied can be allocated as a pen search period for searching for a new pen until a preset maximum pen pairing number (e.g., 2, 4, 6, or 8).

In the touch display device according to embodiments of the present disclosure, the beacon signal can be a signal whose voltage level changes non-periodically, and the touch driving signal can be a signal whose voltage level changes periodically.

In the touch display device according to embodiments of the present disclosure, when the number of pens which have been paired increases, a time length occupied by the pen-related period in the one frame time can increase and a time length occupied by the pen search period in the one frame time can decrease.

According to embodiments of the present disclosure, it is possible to provide a touch display device and a touch senjsing method capable of searching a pen at high speed.

According to embodiments of the present disclosure, it is possible to provide a touch display device and a touch senjsing method capable of high-speed pen pairing.

According to embodiments of the present disclosure, it is possible to provide a touch display device and a touch senjsing method capable of reconfiguring a frame by changing the type of all or part of the plurality of touch time periods in the frame depending on the number of pens that have been paired.

According to embodiments of the present disclosure, it is possible to provide a touch display device and a touch senjsing method designed with highly scalable pen protocol to flexibly change the pen mode.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

FIG. 9 illustratively explains a pen protocol according to embodiments of the present disclosure.

FIG. 10 illustrates a panel driving signal and a pen signal for each type of touch time period in a pen protocol according to embodiments of the present disclosure.

FIG. 15 is a diagram illustrating a panel driving signal and a pen signal for each type of touch time period configured according to an adaptive touch frame configuration method for high-speed pen search in a pen protocol according to embodiments of the present disclosure.

FIGS. 17 to 19 are diagrams illustrating an adaptive touch frame configuration for high-speed pen search for each of three pen modes in a pen protocol according to embodiments of the present disclosure.

FIG. 18 is a diagram illustrating an adaptive touch frame configuration for high-speed pen search in a double pen mode (2 pen mode) in a pen protocol according to embodiments of the present disclosure.

FIG. 19 is a diagram illustrating an adaptive touch frame configuration for high-speed pen search in a single pen mode (1 pen mode) in a pen protocol according to embodiments of the present disclosure.

FIGS. 20A and 20B are diagrams for explaining an operation of an unpaired pen and a quick pairing operation with respect to a beacon signal including mode conversion information in a pen protocol according to embodiments of the present disclosure.

FIGS. 22A, 22B, 22C, and 22D are diagrams for explaining the effects of shortening the pairing time according to the pen protocol according to embodiments of the present disclosure.

DETAILED DESCRIPTION OF THE EMBODIMENTS

Figure 1:
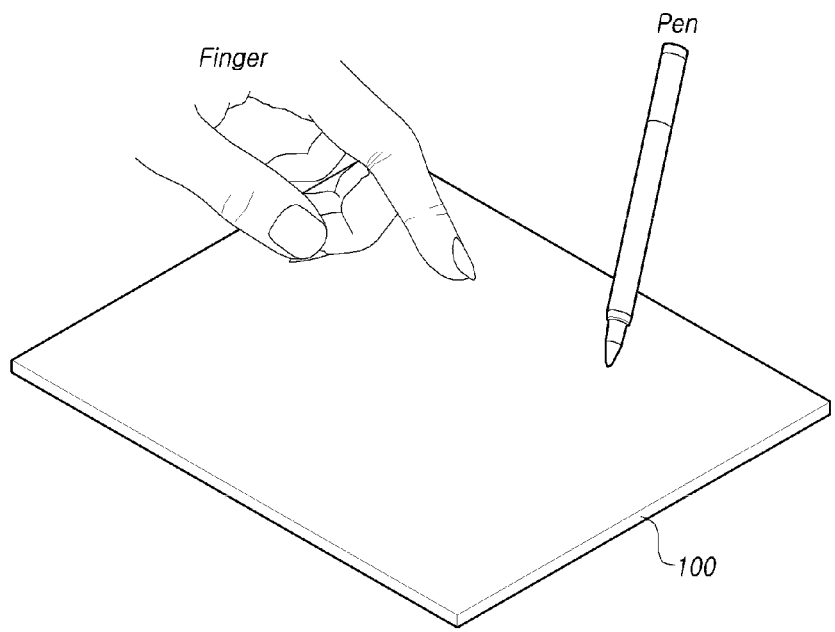
FIG. 1 illustrates a touch display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

FIG. 1 illustrates a touch display device 100 according to embodiments of the present disclosure. All the components of each touch display device according to all embodiments of the present disclosure are operatively coupled and configured.

The touch display device 100 according to the embodiments of the present disclosure can provide an image display function for displaying an image, and can also provide a touch sensing function using a finger and/or a pen as a touch object.

Here, the pen can be also referred to as a stylus or a stylus pen, can include an active pen which has a signal transmission/reception function, or can perform an interlocking operation with the touch display device 100, or includes own power source, and a passive pen without signal transmission/reception function and own power source.

For example, the touch display device 100 according to embodiments of the present disclosure can be a television, a computer monitor, a vehicle monitor, or the like, or can be a mobile device such as a tablet or a smart phone.

The touch display device 100 according to embodiments of the present disclosure can include a display part for providing an image display function and a touch sensing part for touch sensing.

Hereinafter, it will be described a display part and a touch sensing part of the touch display device 100 in more detail with reference to FIGS. 2 and 3.

Figure 2:
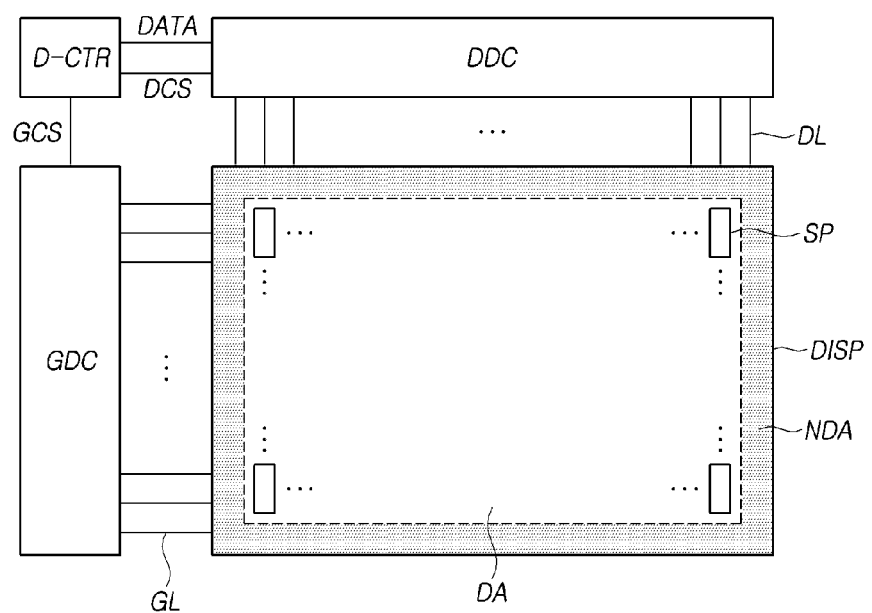
FIG. 2 illustrates a display part of a touch display device according to embodiments of the present disclosure.

FIG. 2 illustrates a display part of a touch display device 100 according to embodiments of the present disclosure.

Referring to FIG. 2, the display part of the touch display device 100 according to embodiments of the present disclosure can include a display panel DISP, a data driving circuit DDC, a gate driving circuit GDC, a display controller D-CTR, and the like.

The display panel DISP can include a plurality of data lines DL and a plurality of gate lines GL, and a plurality of subpixels SP connected to the plurality of data lines DL and the plurality of gate lines GL.

The display panel DISP can include a display area DA in which an image is displayed and a non-display area NDA in which an image is not displayed. The plurality of subpixels SP can be arranged in the display area DA of the display panel DISP. Various signal lines can be arranged in the non-display area NDA of the display panel DISP.

The data driving circuit DDC and the gate driving circuit GDC can be electrically connected in the non-display area NDA of the display panel DISP.

The data driving circuit DDC drives the plurality of data lines DL by supplying data voltages to the plurality of data lines DL.

The gate driving circuit GDC drives the plurality of gate lines GL by supplying gate signals (referred to as scan signals) to the plurality of gate lines GL.

The display controller D-CTR controls the operation of the data driving circuit DDC and the gate driving circuit GDC by supplying various control signals DCS, GCS to the data driving circuit DDC and the gate driving circuit GDC.

The display controller D-CTR starts scanning according to the timing implemented in each frame, and converts the input image data input from the outside according to the data signal format used by the data driving circuit DDC, and outputs the generated image data DATA and controls the data drive at an appropriate time according to the scan.

The display controller D-CTR can be a timing controller TCON used in a typical display technology, or a control device including a timing controller.

The display controller D-CTR can be implemented as a separate component from the data driving circuit DDC, or can be implemented as an integrated circuit together with the data driving circuit DDC.

The data driving circuit DDC can be located only on one side (e.g., upper or lower) of the display panel DISP, or, in some cases, can be located on both sides of the display panel DISP (e.g., upper and lower sides) according to a driving method, a panel design method, and the like.

The data driving circuit DDC can be electrically connected to the non-display area NDA of the display panel DISP. In some cases, the data driving circuit DDC can be disposed to overlap the display area DA of the display panel DISP.

The data driving circuit DDC can be implemented by including at least one source driver integrated circuit. Here, each source driver integrated circuit can include a shift register, a latch circuit, a digital-to-analog converter DAC, an output buffer, and the like. Each source driver integrated circuit can further include an analog-to-digital converter in some cases.

For example, the data driving circuit DDC can be connected to the display panel DISP by a tape automated bonding (TAB) method, or can be connected to a bonding pad of the display panel DISP in a chip-on-glass (COG) or a chip-on-panel (COP) method, or can be implemented in a chip-on-film (COF) method to be connected to the display panel DISP.

The gate driving circuit GDC can be located only on one side of the display panel DISP (e.g., left or right or upper or lower), or, in some cases, can be located on both sides of the display panel DISP (e.g., right and left sides) according to a driving method, a panel design method, and the like.

The gate driving circuit GDC can be electrically connected to the non-display area NDA of the display panel DISP or can be disposed in the non-display area NDA of the display panel DISP. The gate driving circuit GDC can be disposed to overlap the display area DA of the display panel DISP.

The gate driving circuit GDC can be implemented by including at least one gate driver integrated circuit. Here, each gate driver integrated circuit can include a shift register, a level shifter, and the like.

For example, the gate driving circuit GDC can be connected to the display panel DISP by a tape automated bonding (TAB) method, or can be connected to a bonding pad of the display panel DISP in a chip-on-glass (COG) or a chip-on-panel (COP) method, or can be connected to the display panel DISP according to a chip-on-film (COF) method. Alternatively, the gate driving circuit GDC can be a gate-in-panel (GIP) type and can be formed in the non-display area NDA of the display panel DISP. The gate driving circuit GDC can be disposed on or connected to the substrate SUB. For example, in the case of the GIP type, the gate driving circuit GDC can be disposed in the non-display area NDA of the substrate SUB. The gate driving circuit GDC can be connected to the substrate SUB in the case of a chip-on-glass (COG) type, a chip-on-film (COF) type, or the like.

Meanwhile, the display panel DISP can be various types of display panels such as a liquid crystal display panel, an organic light emitting display panel, and a plasma display panel.

Figure 3:
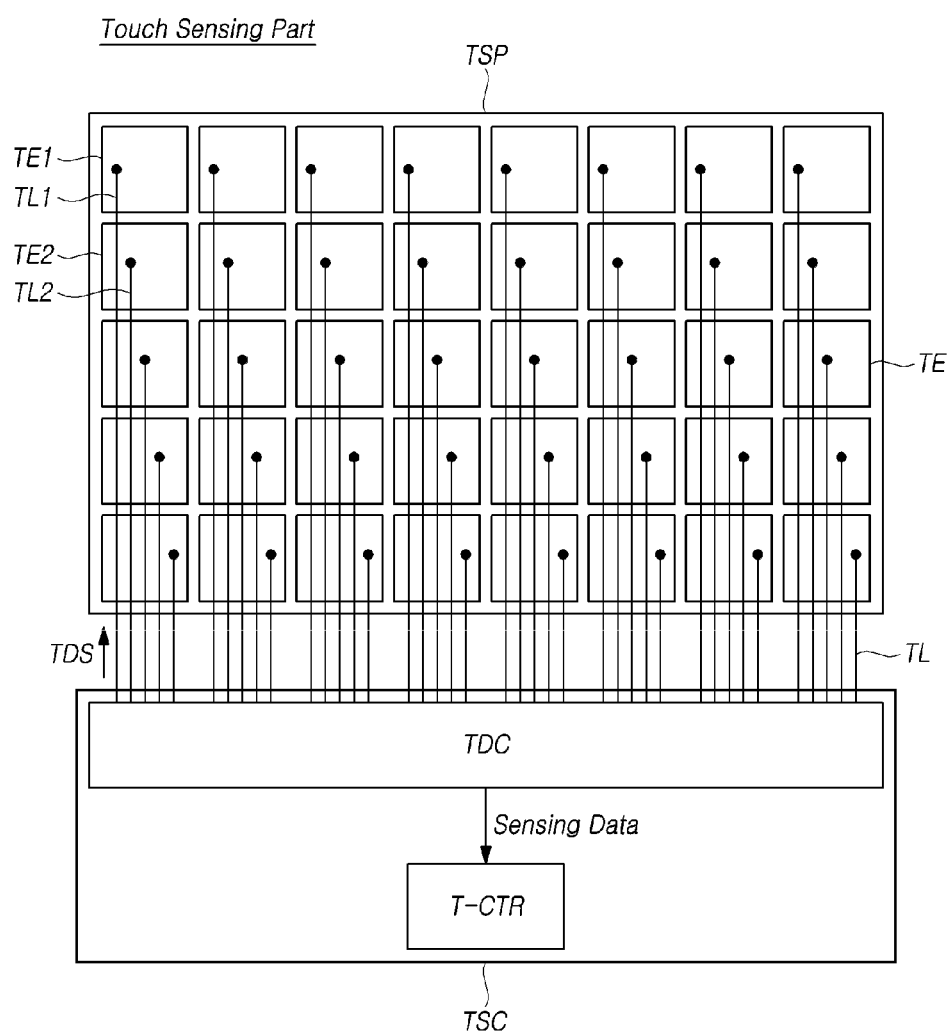
FIG. 3 illustrates a touch sensing part of a touch display device according to embodiments of the present disclosure.
Figure 4:
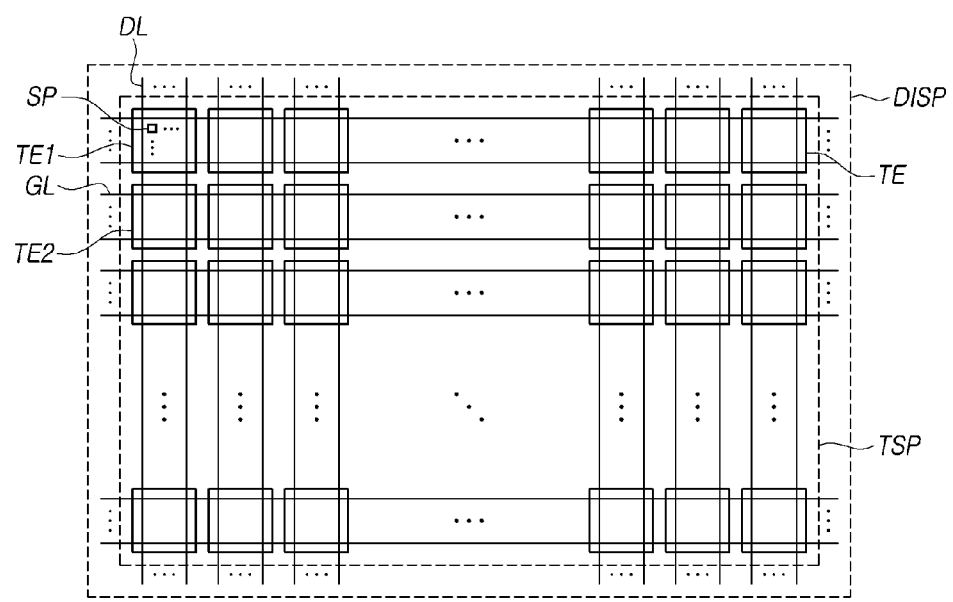
FIG. 4 illustrates a display panel and a touch panel of a touch display device according to embodiments of the present disclosure.

FIG. 3 illustrates a touch sensing part of a touch display device 100 according to embodiments of the present disclosure, and FIG. 4 illustrates a display panel DISP and a touch panel TSP of a touch display device 100 according to embodiments of the present disclosure.

Referring to FIG. 3, a touch display device 100 according to embodiments of the present disclosure can include a touch panel TSP and a touch sensing circuit TSC for sensing a touch input by a finger and/or a pen.

The touch sensing circuit TSC can include a touch driving circuit TDC for driving and sensing the touch sensing circuit TSC, and a touch controller T-CTR that receives sensing data from the touch driving circuit TDC to calculate a touch position.

The touch panel TSP can include a touch sensor including a plurality of touch electrodes TE. The touch panel TSP can further include a plurality of touch lines TL for electrically connecting the plurality of touch electrodes TE corresponding to the touch sensor to the touch driving circuit TDC.

The touch driving circuit TDC can supply the touch driving signal TDS to all or part of the plurality of touch electrodes TE, and can generate sensing data by sensing all or part of the plurality of touch electrodes TE and provide the sensing data to the touch controller T-CTR. Here, the sensing of the touch electrode TE by the touch driving circuit TDC can mean a detection of an electric signal from the touch electrode TE.

The touch controller T-CTR can acquire touch presence and/or touch coordinates (touch position) by using sensing data received from the touch driving circuit TDC.

The touch driving signal TDS can be a signal whose voltage level changes over time. For example, the touch driving signal TDS can be of various types such as a square wave, a triangle wave, or a sine wave.

The touch display device 100 can provide a self-capacitance-based touch sensing function that senses a touch by measuring a capacitance formed on each touch electrode TE or a change thereof, or can provide a mutual-capacitance-based touch sensing function that senses a touch by measuring a capacitance between the touch electrodes TE or a change thereof.

The touch display device 100 can provide both a self-capacitance-based touch sensing function and a mutual-capacitance-based touch sensing function. For example, the touch display device 100 can provide a self-capacitance-based touch sensing function and a mutual-capacitance-based touch sensing function at different time periods.

In the case that the touch display device 100 provides a self-capacitance-based touch sensing function, the touch driving circuit TDC supplies a touch driving signal TDS to each of the plurality of touch electrodes TE, and senses the touch electrode TE to which the driving signal TDS is supplied. Here, the sensing result can correspond to the self-capacitance of the touch electrode TE.

In the case that the touch display device 100 provides a mutual-capacitance-based touch sensing function, a plurality of touch electrodes TE are classified into driving touch electrodes and sensing touch electrodes, and the touch driving circuit TDC supplies a touch driving signal TDS to the driving touch electrodes and senses the sensing touch electrodes. Here, the sensing result can correspond to the mutual capacitance formed between the sensing touch electrode and the driving touch electrode.

Meanwhile, in the touch display device 100 according to exemplary embodiments, the touch panel TSP can exist outside the display panel DISP or can be embedded in the display panel DISP.

In the case that the touch panel TSP is positioned outside the display panel DISP, the touch panel TSP and the display panel DISP can be manufactured according to a separate manufacturing process, and then the display panel DISP and the touch panel TSP can be bonded.

If the touch panel TSP is embedded in the display panel DISP, a plurality of touch electrodes TE can be formed together during a process of manufacturing the display panel DISP.

Meanwhile, the plurality of touch electrodes TE can be dedicated electrodes for touch sensing.

Alternatively, the plurality of touch electrodes TE can also be used when driving the display. For example, while the plurality of touch electrodes TE is utilized for touch sensing, the plurality of touch electrodes TE can serve as a common electrode to which a common voltage is applied in a display driving.

In the following, for convenience of description, it is assumed that the touch display device 100 provides the self-capacitance-based touch sensing function, and the touch panel TSP is a type embedded in the display panel DISP.

For example, referring to FIG. 3, in the touch panel TSP of the touch display device 100 according to embodiments of the present disclosure, a plurality of touch electrodes TE can be arranged in a matrix form.

Referring to FIG. 3, each of the plurality of touch electrodes TE can be electrically connected to the touch electrode driving circuit CDC through one or more touch lines TL.

Referring to FIG. 3, a plurality of touch lines TL can overlap one or more touch electrodes TE. In some cases, the plurality of touch lines TL can be connected to the touch driving circuit TDC by bypassing to an area where the plurality of touch electrodes TE are not disposed.

Referring to FIG. 3, the plurality of touch electrodes TE can include a first touch electrode TE1 and a second touch electrode TE2 positioned in the same column direction. The plurality of touch lines TL can include a first touch line TL1 for electrically connecting the first touch electrode TE1 and the touch driving circuit TDC, and a second touch line TL2 for electrically connecting a second touch electrode TE2 and the touch driving circuit TDC.

The first touch line TL1 can overlap the first touch electrode TE1 and the second touch electrode TE2. The first touch line TL1 can be electrically connected to the first touch electrode TE1 in the touch panel TSP, and can be insulated from the second touch electrode TE2 in the touch panel TSP.

The second touch line TL2 can overlap the second touch electrode TE2, and may or may not overlap the first touch electrode TEL The second touch line TL2 can be electrically connected to the second touch electrode TE2 in the touch panel TSP and can be insulated from the first touch electrode TE1 in the touch panel TSP.

The first touch line TL1 and the second touch line TL2 can be insulated from each other in the touch panel TSP. The first touch line TL1 and the second touch line TL2 can be electrically connected at a specific driving timing in the touch driving circuit TDC. For example, during a driving timing period in which a common voltage for driving a display should be simultaneously applied to the first touch electrode TE1 and the second touch electrode TE2, the first touch line TL1 and the second touch line TL2 can be electrically connected in the touch driving circuit TDC.

In FIG. 3, one touch electrode TE has a square block shape, but this is only an example for convenience of description, and can be designed in various shapes (e.g., diamond, long rectangle, etc.). In FIG. 3, all of the plurality of touch electrodes TE are formed in the same size and shape, but this is only an example for convenience of description, and some of the touch electrodes TE among the plurality of touch electrodes TE can have at least one of a shape and a size different from other touch electrodes TE.

Referring to FIG. 4, as described above, the touch panel TSP can be embedded in the display panel DISP. In this case, a plurality of touch electrodes TE can be formed together during a process of manufacturing the display panel DISP.

The size of the area in which one touch electrode TE is formed can correspond to the size of the area in which one subpixel SP is formed. Alternatively, as illustrated in FIG. 4, a size of an area in which one touch electrode TE is formed can be larger than a size of an area in which one subpixel SP is formed.

In the case that the size of the area in which one touch electrode TE is formed is larger than the size of the area in which two or more subpixels SP are formed, one touch electrode TE can overlap two or more data lines DL and two or more gate lines GL.

In the arrangement structure of the first touch electrode TE1 and the second touch electrode TE2 positioned in the same column direction among a plurality of touch electrodes, the first touch electrode TE1 can overlap two or more data lines and two or more gate lines. The second touch electrode TE2 can overlap two or more data lines and two or more gate lines.

Two or more data lines overlapping the first touch electrode TE1 and two or more data lines overlapping the second touch electrode TE2 can be the same. Two or more gate lines overlapping the first touch electrode TE1 and two or more gate lines overlapping the second touch electrode TE2 can be different from each other.

The touch driving circuit TDC and the touch controller T-CTR can be implemented as individual components or as one component.

For example, the touch driving circuit TDC can be implemented as a readout IC, and the touch controller T-CTR can be implemented as a micro control unit (MCU).

Meanwhile, the touch driving circuit TDC and the data driving circuit DDC can be integrated and implemented in one integrated circuit chip.

The touch display device 100 can include one or more integrated driving circuits SRIC. Each integrated driving circuit SRIC can include one or more touch electrode driving circuits CDC and one or more data driving circuits DDC.

Meanwhile, the touch controller T-CTR can supply a basic signal that is the basis of the touch driving signal TDS to the touch driving circuit TDC. The touch driving signal TDS can be of various types, such as a square wave (pulse wave), a triangle wave, or a sine wave. For example, if the touch driving signal TDS is a square wave, the basic signal can be a pulse width modulation (PWM) signal type.

Figure 5:
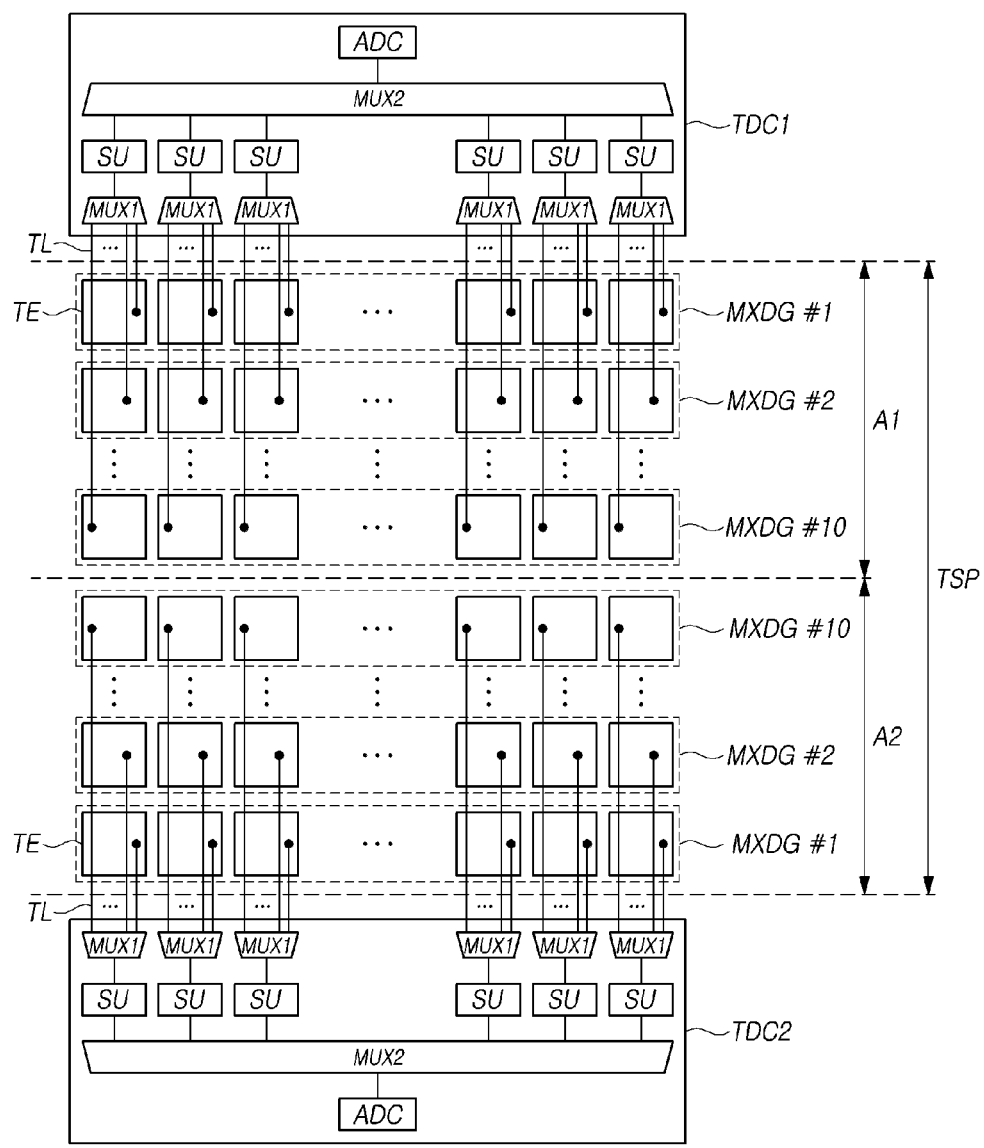
FIG. 5 illustrates a touch sensing system having a group driving structure of a touch display device according to embodiments of the present disclosure.

FIG. 5 illustrates a touch sensing system having a group driving structure of a touch display device 100 according to embodiments of the present disclosure.

Referring to FIG. 5, the touch panel TSP can include a first area A1 and a second area A2 divided up and down. For example, it is assumed that the first area A1 of the touch panel TSP includes 200 touch electrodes TE arranged in 10 rows and 20 columns, and the second area A2 of the touch panel TSP includes 200 touch electrodes TE arranged in 10 rows and 20 columns.

Referring to FIG. 5, the touch driving circuit TDC can include a first touch driving circuit TDC1 that drives and senses a plurality of touch electrodes TE disposed in the first area A1 of the touch panel TSP, and a second touch driving circuit TDC2 that drives and senses a plurality of touch electrodes TE disposed in the second area A2 of the touch panel TSP.

Each of the first and second touch driving circuits TDC1 and TDC2 can include 20 first multiplexers MUX1, 20 sensing units SU, one or more second multiplexers MUX2, and one or more analog-to-digital converters ADC.

The number of the 20 first multiplexers MUX1 can correspond to the number of touch electrodes TE that can be sensed at the same time (e.g., 20). In addition, the 20 sensing units SU can correspond to the 20 first multiplexers MUX1 on a one-to-one basis.

For example, as illustrated in FIG. 5, 20 touch electrodes TE arranged in one row of touch electrodes can be simultaneously sensed. In this case, each of the first and second touch driving circuits TDC1 and TDC2 can include 20 first multiplexers MUX1.

In the touch display device 100 according to the embodiments of the present disclosure, touch electrodes TE that can be simultaneously driven and sensed at the same time can be defined as one multiplexing driving group (MXDG #1 to MXDG #10). For example, each of the first and second touch driving circuits TDC1 and TDC2 can simultaneously supply the touch driving signal TDS to the touch electrodes TE included in one multiplexing driving group MXDG #1 to MXDG #10, and can sense at the same time.

Referring to FIG. 5, in the touch display device 100, 10 multiplexing driving groups MXDG #1 to MXDG #10 are defined for each of the first and second touch driving circuits TDC1 and TDC2. Each of the first and second touch driving circuits TDC1 and can sequentially sense 10 multiplexing driving groups MXDG #1 to MXDG #10, but can simultaneously sense the 20 touch electrodes TE included in each of the 10 multiplexing driving groups MXDG #1 to MXDG #10.

In the case of the example of FIG. 5, one touch frame time is a period needed for each of the first and second touch driving circuits TDC1 and TDC2 to sense all 10 multiplexing driving groups MXDG #1 to MXDG #10.

Each of the 20 first multiplexers MUX1 included in each of the first and second touch driving circuits TDC1 and TDC2 can be connected to 10 touch electrodes TE through 10 touch lines TL arranged in the same touch electrode column. Here, 10 touch electrodes TE arranged in each touch electrode column are included in each of 10 multiplexed driving groups MXDG #1 to MXDG #10.

Each of the 20 first multiplexers MUX1 included in each of the first and second touch driving circuits TDC1 and TDC2 selects one of 10 touch electrodes TE and electrically connects it to the sensing unit SU. Accordingly, the sensing unit SU can sense one touch electrode TE selected from among the 10 touch electrodes TE by the first multiplexer MUX1.

In order for each of the first and second touch driving circuits TDC1 and TDC2 to sequentially sense 10 multiplexing driving groups MXDG #1 to MXDG #10, each of the 20 first multiplexers MUX1 included in each of the first and second touch driving circuits TDC1 and TDC2 sequentially selects 10 touch electrodes TE. Accordingly, each of the 20 sensing units SU included in each of the first and second touch driving circuits TDC1 and TDC2 can sequentially sense the 10 touch electrodes TE.

The second multiplexer MUX2 included in each of the first and second touch driving circuits TDC1 and TDC2 selects one of 10 sensing units SU and connects it to an analog-to-digital converter ADC. Accordingly, the analog-to-digital converter ADC can convert a signal output by sensing the touch electrode TE by the selected sensing unit SU into a digital sensing value.

The touch driving circuit TDC can transmit sensing data including digital sensing values converted by the analog-to-digital converter ADC to the touch controller T-CTR.

Figure 6:
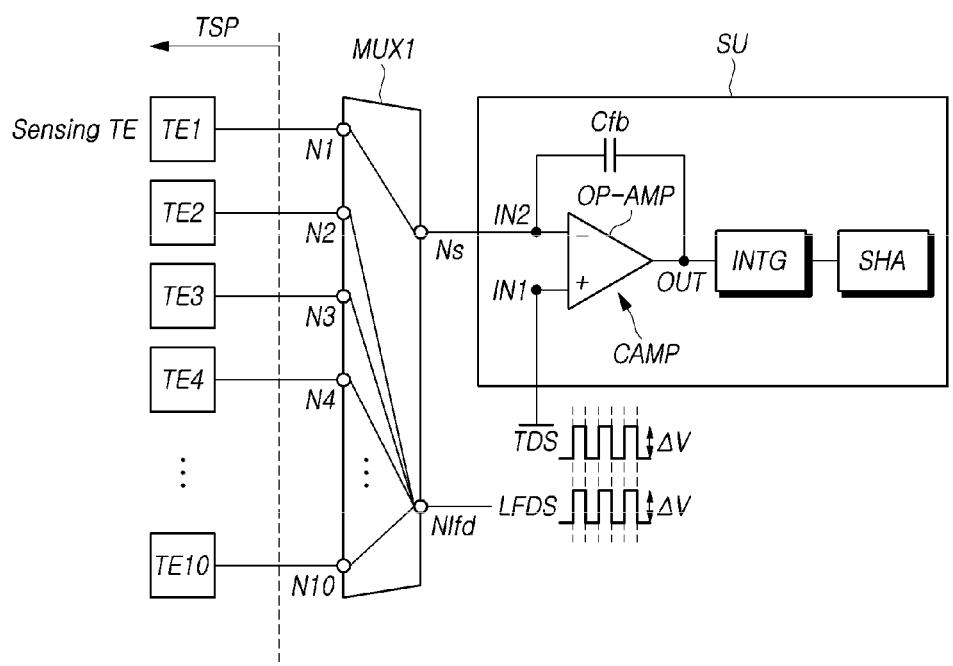
FIG. 6 illustrates a sensing unit in a touch driving circuit of a touch display device according to embodiments of the present disclosure.

FIG. 6 illustrates a sensing unit SU in a touch driving circuit TDC of a touch display device 100 according to embodiments of the present disclosure.

Referring to FIG. 6, the sensing unit SU can include a charge amplifier CAMP, an integrator INTG, a sample and hold circuit SHA, and the like.

The first multiplexer MUX1 can include 10 nodes N1 to N10 connected to the 10 touch electrodes TE1 to TE10 arranged in the same row of touch electrodes, a sensing node Ns to which the sensing unit SU is connected, and a load-free driving node Nlfd to which the load-free driving signal LFDS is input.

In the example of FIG. 6, among the 10 touch electrodes TE1 to TE10 arranged in the same row of touch electrodes, the first touch electrode TE1 is a sensing touch electrode, and the remaining touch electrodes TE2 to TE10 are non-sensing touch electrodes.

Accordingly, in the first multiplexer MUX1, the sensing node Ns can be connected to a first node N1 to which the first touch electrode TE1 is connected among the 10 nodes N1 to N10, and the load-free driving node Nlfd can be connected to all or part (e.g., a second node N2 arranged closest to the first node N1) of the remaining nodes N2 to N10 except for the first node N1 among the 10 nodes N1 to N10.

The charge amplifier CAMP can include an operational amplifier OP-AMP including a first input terminal IN1 to which a touch driving signal TDS is input, a second input terminal IN2 electrically connected to the touch electrode TE selected as a sensing touch electrode by the first multiplexer MUX1 and an output terminal OUT for outputting an output signal Vout, and a feedback capacitor Cfb connected between the second input terminal IN2 and the output terminal OUT of the operational amplifier OP-AMP.

The touch driving signal TDS input to the first input terminal IN1 is output to the second input terminal IN2 through the inside of the operational amplifier OP-AMP, and can be input to the sensing node Ns connected to the second input terminal IN2. Accordingly, the touch driving signal TDS can be applied to the first touch electrode TE1 connected to the sensing node Ns.

In addition, the load-free driving signal LFDS applied to the load-free driving node Nlfd can be applied to the non-sensing touch electrodes TE2 to TE8 through the load-free driving node Nlfd. The amplitude ΔV of the load-free driving signal LFDS can be the same as the amplitude ΔV of the touch driving signal TDS, or the frequency of the load-free driving signal LFDS can be the same as the frequency of the touch driving signal TDS, or the phase of the load-free driving signal LFDS can be the same as the phase of the touch driving signal TDS.

The charge amplifier CAMP can receive a touch sensing signal from the first touch electrode TE1 to which the touch driving signal TDS is supplied. Charge is charged in the feedback capacitor Cfb by the received touch sensing signal, and accordingly, the output signal Vout output to the output terminal OUT of the charge amplifier CAMP can be input to the integrator INTG.

The integrator INTG can output an integral value by integrating the output signal Vout output from the charge amplifier CAMP. The integrator INTG can be configured separately from the charge amplifier CAMP, or can be implemented integrally with the charge amplifier CAMP.

The sample and hold circuit SHA can store the integral value output from the integrator INTG. When the corresponding sensing unit SU is selected by the second multiplexer MUX2, the integral value stored by the sample and hold circuit SHA is input to the analog-to-digital converter ADC.

Figure 7:
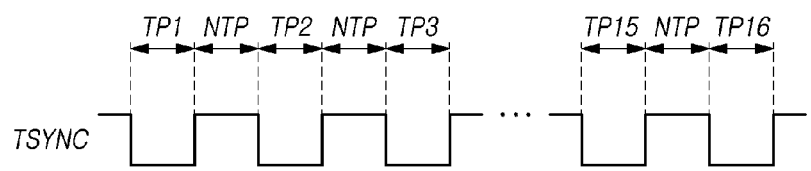
FIG. 7 illustrates touch driving timings of a touch display device according to embodiments of the present disclosure.

FIG. 7 illustrates touch driving timings of a touch display device 100 according to embodiments of the present disclosure.

Referring to FIG. 7, the touch display device 100 according to embodiments of the present disclosure can use a touch synchronization signal TSYNC that defines the touch time periods TP1 to TP16 for touch sensing.

In the touch display device 100 according to embodiments of the present disclosure, the display controller D-CTR, the touch controller T-CTR and the touch driving circuit TDC can recognize the touch driving timing for touch sensing based on the touch synchronization signal TSYNC.

For example, the display controller D-CTR can provide the touch synchronization signal TSYNC to the touch controller T-CTR, and the touch controller T-CTR can provide the touch synchronization signal TSYNC to the touch driving circuit TDC.

The touch synchronization signal TSYNC can repeatedly include a first level voltage section representing the touch time periods TP1 to TP16 and a second level voltage section representing the non-touch time period NTP.

For example, the first level voltage section of the touch synchronization signal TSYNC can be a section having a predetermined low level voltage, and the second level voltage section of the touch synchronization signal TSYNC can be a section having a high level voltage higher than the predetermined low level voltage. Alternatively, the first level voltage section of the touch synchronization signal TSYNC can be a section having the high level voltage, and the second level voltage section of the touch synchronization signal TSYNC can be a section having the low level voltage.

When the touch driving circuit TDC recognizes the first level voltage section of the touch synchronization signal TSYNC received from the touch controller T-CTR, the touch driving circuit TDC can supply the touch driving signal TDS to the predetermined touch electrode TE and can sense the predetermined touch electrode TE.

As an example, the touch display device 100 according to embodiments of the present disclosure can perform touch driving and display driving by a time-division manner. For example, the touch display device 100 can time-divide one display frame period into one or more touch time periods TP1 to TP16 and one or more display driving periods, and alternately perform touch driving and display driving. In this case, the first level voltage section of the touch synchronization signal TSYNC can be the touch time period TP1 to TP16, and the non-touch time period NTP indicated by the second level voltage section of the touch synchronization signal TSYNC can be a display driving period for displaying an image.

As another example, the touch display device 100 according to embodiments of the present disclosure can simultaneously perform touch driving and display driving. In this case, the first level voltage section of the touch synchronization signal TSYNC can be a display driving period and a touch time period TP1 to TP16. In addition, the non-touch time period NTP indicated by the second level voltage section of the touch synchronization signal TSYNC can be a blank period between display driving periods. Here, the touch synchronization signal TSYNC is used when driving the display, and can be a vertical synchronization signal VSYNC that alternately includes a high level voltage section (or low level voltage section) representing an active period (display driving period) and a low level voltage section (or high level voltage section) representing a blank period.

The touch display device 100 according to embodiments of the present disclosure can use the touch synchronization signal TSYNC to define a touch frame time, which is a period needed to sense the entire area of the touch panel TSP.

For example, the touch display device 100 according to the embodiments of the present disclosure can allocate one touch time period indicated by one first level voltage section included in the touch synchronization signal TSYNC as a touch frame time.

As another example, the touch display device 100 according to the embodiments of the present disclosure can allocate two or more touch time periods indicated by two or more first level voltage sections included in the touch synchronization signal TSYNC as one touch frame time.

Referring to FIG. 5, in the case that the touch display device 100 performs the touch driving and display driving by a time-division manner and the touch electrode TE is also used as a common electrode for driving the display, the touch driving circuit TDC can supply a common voltage, which can be a DC voltage, to the touch electrode TE during the non-touch time period NTP, and can supply the touch driving signal TDS to the touch electrode TE during the touch time period TP1 to TP16.

Meanwhile, while the touch driving signal TDS of which the voltage level is changed is applied to the touch electrode TE to be sensed among the plurality of touch electrodes TE, if a DC voltage or a signal having a voltage fluctuation characteristic different from the touch driving signal TDS is applied to other electrodes or lines around, the sensed touch electrode TE and other electrodes or lines positioned around the touch electrode TE can form a parasitic capacitor. Such a parasitic capacitor can affect the sensing value of the touch electrode TE to be sensed, so that the touch sensitivity can be greatly deteriorated.

Accordingly, while the touch driving signal TDS is applied to the sensed touch electrode TE, the touch display device 100 according to the embodiments of the present disclosure can apply a signal having the same one or more of frequency, amplitude, and phase as the touch driving signal TDS to other electrodes or lines located around the sensed touch electrode TE. Here, a signal having the same at least one of the frequency, amplitude, and phase as the touch driving signal TDS is referred to as a load-free driving signal.

For example, other electrodes or lines located around the sensed touch electrode TE can include data lines DL, gate lines GL, and the like, and can further include non-sensed touch electrodes TE that are not sensed.

For example, in the case that the touch panel TSP is embedded in the display panel DISP, during the touch driving, the touch driving signal TDS can be applied to the sensed touch electrodes TE among a plurality of touch electrodes TE disposed on the display panel DISP, and the load-free driving signal having the same at least one of the frequency, amplitude and phase as the touch driving signal TDS can be applied to the remaining touch electrodes TE, all data lines DL and all gate lines GL.

The touch display device 100 according to embodiments of the present disclosure can include a display panel DISP with an embedded touch sensor, a plurality of data lines DL and a plurality of gate lines GL, a data driving circuit DDC supplying data signals for image display to the plurality of data lines DL during a non-touch time period NTP between two touch time periods, and a gate driving circuit GDC supplying a scan signal to one or more gate lines GL among the plurality of gate lines GL during the non-touch time period NTP between two touch time periods TP.

Figure 8:
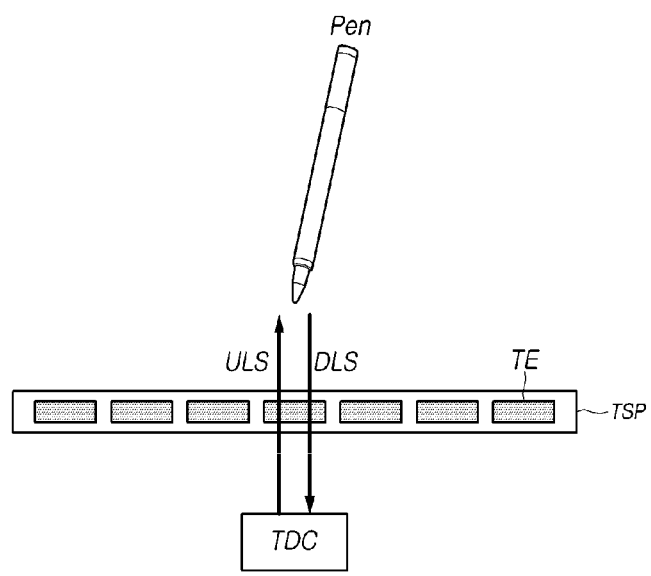
FIG. 8 illustrates bidirectional communication between a pen and a touch display device according to embodiments of the present disclosure.

FIG. 8 illustrates bidirectional communication between a pen and a touch display device 100 according to embodiments of the present disclosure.

Referring to FIG. 8, for pen sensing, a touch display device 100 according to an embodiment of the present disclosure can perform bidirectional communication between the pen and the touch driving circuit TDC through the touch panel TSP.

The bidirectional communication can include uplink communication in which a touch driving circuit TDC transmits an uplink signal ULS to the pen through the touch panel TSP, and downlink communication in which the pen transmits a downlink signal DLS to the touch driving circuit TDC through the touch panel TSP.

In uplink communication, the touch driving circuit TDC applies the uplink signal ULS to one or more touch electrodes TE disposed on the touch panel TSP, so that the pen can receive the uplink signal ULS through one or more touch electrodes TE. Here, the uplink signal ULS is also referred to as a panel driving signal.

In downlink communication, the pen applies the downlink signal DLS to one or more touch electrodes TE disposed on the touch panel TSP, so that the touch driving circuit TDC can receive the downlink signal DLS through one or more touch electrodes TE. Here, the downlink signal DLS is also referred to as a pen signal or a pen driving signal.

FIG. 9 illustratively explains a pen protocol according to embodiments of the present disclosure, and FIG. 10 illustrates a panel driving signal and a pen signal for each type (B, P, T, and F) of touch time period in a pen protocol according to embodiments of the present disclosure.

Referring to FIG. 9, each of the 16 touch time periods TP1 to TP16 can be allocated to one of a beacon transmission period (B), a pen position and data sensing period (P), a pen tilt sensing period (T), and a finger touch sensing period (F). The allocation type of each of the 16 touch time periods TP1 to TP16 can be defined as a pen protocol, which is a protocol between the touch display device 100 and a pen.

The beacon transmission period B is a touch time period during which the touch display device 100 transmits a beacon signal to a pen. One or more of the 16 touch time periods TP1 to TP16 can be allocated as the beacon transmission period B. However, hereinafter, it is assumed that a first touch time period TP1 is the beacon transmission period B.

The pen position and data sensing period P is a touch time period in which the position of the pen is sensed and data including various types of information of the pen is recognized. In the example of FIG. 9, the second to fifth touch time periods TP2 to TP5 and the tenth to thirteenth touch time periods TP10 to TP13 are allocated as the pen position and data sensing period P.

The pen tilt sensing period T is a touch time period for detecting the tilt or slope of the pen. In the example of FIG. 9, the sixth to ninth touch time periods TP6 to TP9 are allocated as the pen tilt sensing period T.

The finger touch sensing period F is a touch time period for sensing a touch by a finger (including a passive pen). The example of FIG. 9 is a case in which the fourteenth to sixteenth touch time periods TP14 to TP16 are allocated as the finger touch sensing period F.

The configuration of the 16 touch time periods TP1 to TP16 shown in FIG. 9 is only an example, and can be can be variously modified according to the setting of a sensing speed for a finger touch, a sensing speed for a pen touch, and the number of pens that can be sensed.

Referring to FIG. 10, during the pen tilt sensing period T, the pen outputs a first type of pen signal. The first type of pen signal output from the pen can be applied to at least one of the plurality of touch electrodes TE included in the touch panel TSP. In this case, a DC voltage can be applied as a panel driving signal to the plurality of touch electrodes TE included in the touch panel TSP.

During the pen position and data sensing period P, the pen outputs a second type of pen signal different from the first type of pen signal. The second type of pen signal output from the pen can be applied to at least one of the plurality of touch electrodes TE included in the touch panel TSP. In this case, a DC voltage can be applied as a panel driving signal to the plurality of touch electrodes TE included in the touch panel TSP.

During the beacon transmission period B, the touch driving circuit TDC can apply a beacon signal, which is a type of panel driving signal, to at least one of the plurality of touch electrodes TE included in the touch panel TSP.

In the finger touch sensing period F, the touch driving circuit TDC can apply a touch driving signal TDS, which is another type of a panel driving signal, to at least one of a plurality of touch electrodes TE included in the touch panel TSP.

The first type of pen signal during the pen tilt sensing period T can be a periodic pulse signal. The second type of pen signal during the pen position and data sensing period P can be a non-periodic and information-expressed pulse signal.

Figure 11:
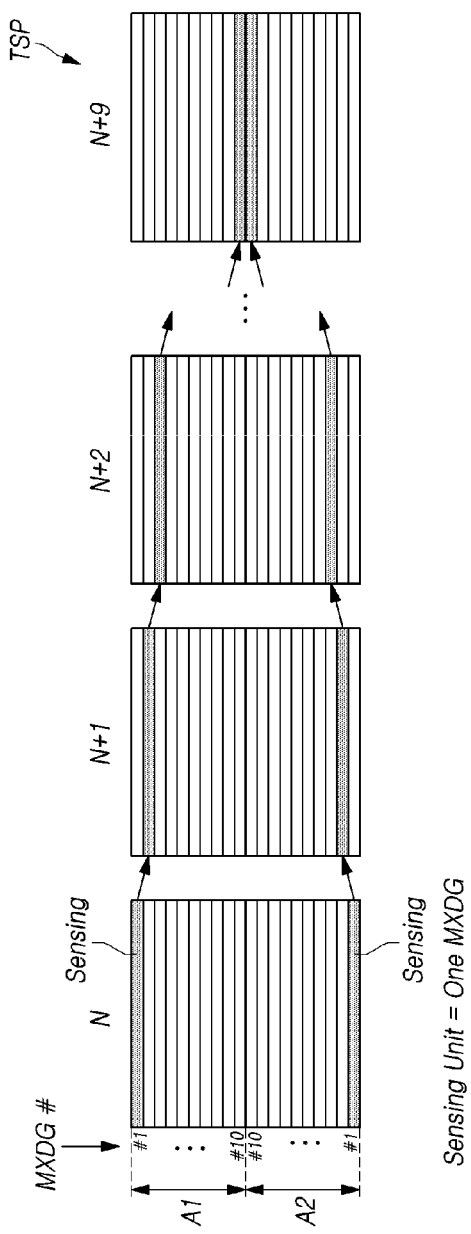
FIG. 11 is a diagram for explaining pen search through full-sensing when sensing is performed in units of one multiplexing driving group in the pen protocol according to embodiments of the present disclosure.

FIG. 11 is a diagram for explaining pen search through full-sensing when sensing is performed in units of one multiplexing driving group in the pen protocol according to embodiments of the present disclosure.

Referring to FIG. 11, each of the first and second touch driving circuits TDC1 and TDC2 included in the touch sensing circuit TSC can sequentially select a plurality of multiplexing driving groups MXDG #1~MXDG #10 including a plurality of touch electrodes TE, and can simultaneously drive and sense a plurality of touch electrodes TE included in a multiplexing driving group sequentially selected from among a plurality of multiplexing driving groups MXDG #1 to MXDG #10.

Referring to FIG. 11, each of the first and second touch driving circuits TDC1 and TDC2 included in the touch sensing circuit TDC can drive and sense the touch electrodes TE included in one of the multiplexing driving groups MXDG #1 to MXDG #10 during each of the m touch time periods TP1 to TP16 (m=16).

Referring to FIG. 11, in the case that each of the first and second touch driving circuits TDC1 and TDC2 senses one multiplexing driving group during one touch time period, the 10 touch time periods N~N+9 are needed in order for each of the first and second touch driving circuits TDC1 and TDC2 to sense all 10 multiplexing driving groups MXDG #1 to MXDG #10 in the first and second areas A1 and A2 (i.e., for full-sensing).

Referring to FIG. 11, if the touch sensing circuit TSC does not use the pen tilt sensing period T for searching for a new pen, the touch sensing circuit TSC needs to use 8 touch time periods TP2~TP5, TP10~TP13 to search for a pen. However, as described above, since the 10 touch time periods are needed for full-sensing, full-sensing for pen search cannot be completed within one frame time. Accordingly, the pen search time can be delayed.

Figure 12:
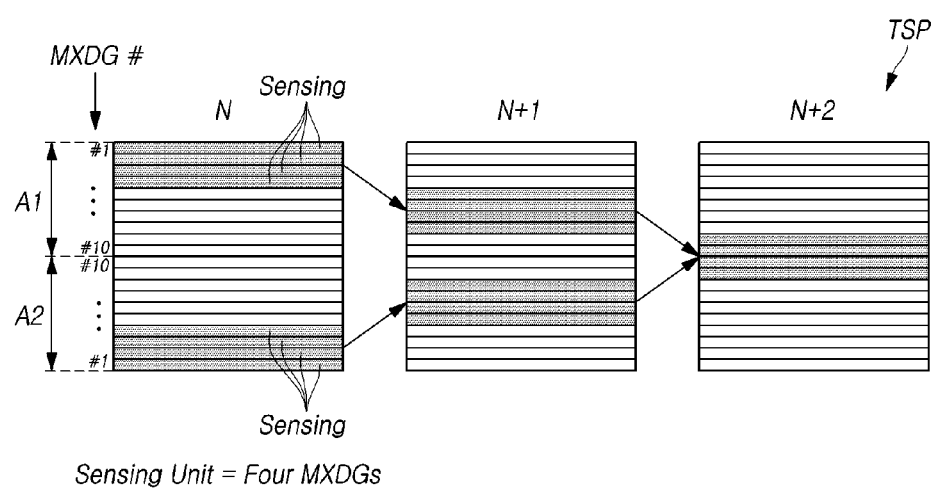
FIG. 12 is a diagram for explaining a high-speed pen search through high-speed full-sensing when sensing in units of four multiplexing driving groups in the pen protocol according to embodiments of the present disclosure.

FIG. 12 is a diagram for explaining a high-speed pen search through high-speed full-sensing when sensing in units of four multiplexing driving groups in the pen protocol according to embodiments of the present disclosure.

Referring to FIG. 12, each of the first and second touch driving circuits TDC1 and TDC2 included in the touch sensing circuit TSC can sequentially select a plurality of multiplexing driving groups MXDG #1~MXDG #10 including a plurality of touch electrodes TE, and can simultaneously drive and sense a plurality of touch electrodes TE included in a multiplexing driving group sequentially selected from among a plurality of multiplexing driving groups MXDG #1 to MXDG #10.

Referring to FIG. 12, each of the first and second touch driving circuits TDC1 and TDC2 included in the touch sensing circuit TDC can drive and sense the touch electrodes TE included in four multiplexing driving groups among the plurality of multiplexing driving groups MXDG #1 to MXDG #10 during each of the m touch time periods TP1 to TP16 (m=16).

In each of the m touch time periods TP1 to TP16 (m=16), the four multiplexing driving groups can be sequentially driven and sensed.

Referring to FIG. 12, in the case that each of the first and second touch driving circuits TDC1 and TDC2 senses four or more multiplexing driving groups during one touch time period, it requires 2.5 touch time periods (N, N+1 and half of N+2) in order for each of the first and second touch driving circuits TDC1 and TDC2 to sense all 10 multiplexing driving groups MXDG #1 to MXDG #10 in the first and second areas A1 and A2 (i.e., for full-sensing). Accordingly, the touch display device 100 can quickly process a pen search to find a new pen.

Referring to FIG. 12, since there are 12 touch time periods TP2 to TP13 for the pen in addition to the beacon transmission period (P) and the finger touch sensing period (F) in 16 touch time periods TP1 to TP16 within one frame time, if each of the first and second touch driving circuits TDC1 and TDC2 senses four multiplexing driving groups during one touch time period, at least four full-sensing can be performed within one frame time. For example, multiple pen sensing processing can be possible within one frame time.

Figure 13:
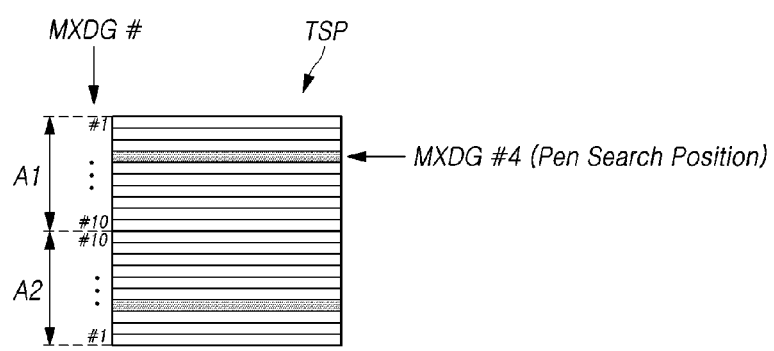
FIG. 13 is a diagram for explaining pairing through driving for one multiplexing driving group after searching for a pen in a pen protocol according to embodiments of the present disclosure.

FIG. 13 is a diagram for explaining pairing through driving for one multiplexing driving group after searching for a pen in a pen protocol according to embodiments of the present disclosure.

Referring to FIG. 13, as described above with reference to FIG. 12, after a pen is searched through high-speed pen search, the touch sensing circuit TSC can check the multiplexing driving group MXDG #4 corresponding to the position of the searched pen The touch sensing circuit TSC can drive and sense the multiplexing driving group MXDG #4 corresponding to the position of the searched pen, and perform pairing process with the newly searched pen.

The touch sensing circuit TSC can receive a pen ID from the newly searched pen through the multiplexing driving group MXDG #4 corresponding to the position of the searched pen, and can transmit a hash value of the pen ID to the pen to perform pairing process with the newly searched pen.

Figure 14:
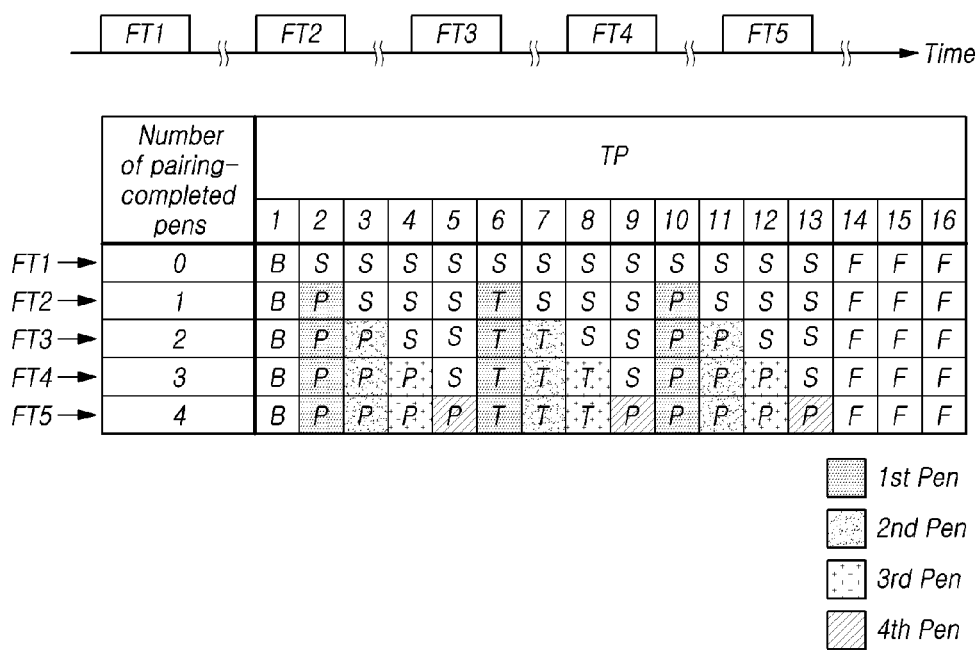
FIG. 14 is a diagram illustrating a method of adaptively configuring a touch frame for high-speed pen search in a pen protocol according to embodiments of the present disclosure.

FIG. 14 is a diagram illustrating a method of adaptively configuring a touch frame for high-speed pen search in a pen protocol according to embodiments of the present disclosure, and FIG. 15 is a diagram illustrating a panel driving signal and a pen signal for each type of touch time period configured according to an adaptive touch frame configuration method for high-speed pen search in a pen protocol according to embodiments of the present disclosure.

Referring to FIG. 14, a touch display device 100 according to embodiments of the present disclosure can include a touch sensor including a plurality of touch electrodes TE, and a touch sensing circuit TSC which senses a plurality of touch electrodes TE during a first frame time FT1, senses a plurality of touch electrodes TE during a second frame time FT2, senses a plurality of touch electrodes TE during a third frame time FT3, senses a plurality of touch electrodes TE during a fourth frame time FT4, and senses a plurality of touch electrodes TE during a fifth frame time FT5.

Referring to FIG. 14, each of the first to fifth frame times FT1 to FT5 can include m touch time periods TP1 to TP16. Here, m is a natural number of 2 or more. In the following, it will be described the case of m=16 as an example.

The order of the m touch time periods TP1 to TP16 included in each of the first to fifth frame times FT1 to FT5 can be arranged as shown in FIG. 14, or can be arranged differently from FIG. 14. In other words, as shown in FIG. 14, TP1, TP2, TP3, TP4, TP5, TP6, TP7, TP8, . . . , TP13, TP14, TP15, TP16 can be arranged. Unlike FIG. 14, for example, TP3, TP7, TP2, TP8, TP5, TP9, . . . , TP16, TP12, TP10, TP4 can be arranged in the order.

Referring to FIG. 14, each of the 16 touch time periods TP1 to TP16 can be allocated to one of a beacon transmission period (B), a pen position and data sensing period (P), a pen tilt sensing period (T), a finger touch sensing period (F), and pen search period (S). The allocation type of each of the 16 touch time periods TP1 to TP16 can be defined as a pen protocol, which is a protocol between the touch display device 100 and a pen.

The beacon transmission period B is a touch time period during which the touch display device 100 transmits a beacon signal to a pen. One or more of the 16 touch time periods TP1 to TP16 can be allocated as the beacon transmission period B. In the following, it is assumed that the first touch time period TP1 is the beacon transmission period B.

The pen position and data sensing period P is a touch time period in which the position of the pen is sensed and data including various types of information of the pen is recognized.

The pen tilt sensing period T is a touch time period for sensing the tilt or the slope of the pen.

The pen search period S is a touch time period for searching for a new pen that has not been paired.

The finger touch sensing period F is a touch time period for sensing a touch by a finger (including a passive pen).

Referring to FIG. 15, during the pen search period S, the pen outputs a first type of pen signal. The first type of pen signal output from the pen can be applied to at least one of the plurality of touch electrodes TE included in the touch panel TSP. In this case, a DC voltage can be applied as a panel driving signal to the plurality of touch electrodes TE included in the touch panel TSP.

During the pen tilt sensing period T, the pen outputs a first type of pen signal. The first type of pen signal output from the pen can be applied to at least one of the plurality of touch electrodes TE included in the touch panel TSP. In this case, a DC voltage can be applied as a panel driving signal to the plurality of touch electrodes TE included in the touch panel TSP.

During the pen position and data sensing period P, the pen outputs a second type of pen signal different from the first type of pen signal. The second type of pen signal output from the pen can be applied to at least one of the plurality of touch electrodes TE included in the touch panel TSP. In this case, a DC voltage can be applied as a panel driving signal to the plurality of touch electrodes TE included in the touch panel TSP.

During the beacon transmission period B, the touch driving circuit TDC can apply a beacon signal, which is a type of panel driving signal, to at least one of a plurality of touch electrodes TE included in the touch panel TSP.

During the finger touch sensing period F, the touch driving circuit TDC can apply a touch driving signal TDS, which is another type of a panel driving signal, to at least one of a plurality of touch electrodes TE included in the touch panel TSP.

Meanwhile, according to the pen protocol, during the finger touch sensing period F, a pen signal output from at least one pen can be applied to at least one of a plurality of touch electrodes TE included in the touch panel TSP. During the finger touch sensing period F, the touch sensing circuit TSC can receive a pen signal from at least one touch electrode TE and search for a new pen using the received pen signal.

The first type of pen signal during the pen search period S and the first type of pen signal during the pen tilt sensing period T can be periodic pulse signals. The second type of pen signal during the pen position and data sensing period P can be a non-periodic and information-expressed pulse signal.

The first type of pen signal during the pen search period S and the first type of pen signal during the pen tilt sensing period T can be the same signal, or can be a signal different from at least one of frequency, phase, and amplitude.

The first type can be a type of a pen signal output from the pen during the pen search period S, and can be a type of a pen signal output from the pen during the pen tilt sensing period T. The second type can be a type of a pen signal output from the pen during the pen position and data sensing period P.

Referring to FIG. 14, the touch display device 100 can transmit the same type of signal to the pen during the first touch time period TP1 of each of the first frame time FT1 and the second frame time FT2.

For example, the first touch time period TP1 of each of the first frame time FT1 and the second frame time FT2 can be the beacon transmission period B in which the touch display device 100 transmits a beacon signal, which can be a control signal of the same type, to a pen. Accordingly, during the first touch time period TP1 of each of the first frame time FT1 and the second frame time FT2, the touch sensing circuit TSC can supply a control signal of the same type and including the same or different information as a beacon signal to the plurality of touch electrodes TE.

The beacon signal is a type of an uplink signal ULS and is a signal for transmitting various control information needed for driving the touch display device 100 to a pen.

The beacon signal can include the same information or different information for each transmission.

The beacon signal can include, for example, touch panel information (when the touch panel TSP is embedded in the display panel DISP, it can be the display panel information) such as touch panel identification information, touch panel type information (e.g., in-cell type), touch time period information, multiplexing driving information, power mode information (e.g., touch time period information in which the panel and pen are not driven to reduce power consumption, etc.), and error check information.

Meanwhile, the beacon signal can include information for driving timing synchronization between the touch panel TSP and the pen.

In addition, the beacon signal can include identification information ID of a pen used for communicating with the touch driving circuit TDC. Here, the identification information ID of the pen can be identification information given to the pen by the pen manufacturer, or can be identification information temporarily assigned to the pen during a period in which communication between the pen and the touch display device 100 is possible after the touch display device 100 searches the pen.

In addition, the beacon signal can include frequency information of a pen signal output from the pen.

In addition, the beacon signal can include information on a signal format (pulse state, pulse format, etc.) of the pen signal output by the pen.

The information included in the above-described beacon signal can be stored in a lookup table of the touch display device 100, and upon updating, update details can be transmitted to a pen. Here, the lookup table can be shared with the pen in advance.

Referring to FIG. 14, each of the second to sixteenth touch time periods TP2 to TP16 included in each of the first to fifth frame times FT1 to FT5 can be configured in a different type according to the number of pens that have been paired.

The example of FIG. 14 is correspondent with a case in which the number of pens having been paired with the touch display device 100 is 0 in the first frame time FT1, the number of pens having been paired with the touch display device 100 is 1 in the second frame time FT2, the number of pens having been paired with the touch display device 100 is 2 in the third frame time FT3, the number of pens having been paired with the touch display device 100 is 3 in the fourth frame time FT4, and the number of pens having been paired with the touch display device 100 is 4 in the fifth frame time FT5.

In the following, referring to FIG. 14, it will be described a method of configuring the touch time periods TP2 to TP16 according to the number of pens that have paired.

According to the example of FIG. 14, if the number of pens paired with the touch display device 100 is 0, among the second to sixteenth touch time periods TP2 to TP16, the second to thirteenth touch time periods TP2 to TP13 can be allocated as a pen search period S for searching for a new pen, and the fourteenth to sixteenth touch time periods TP14 to TP16 can be allocated as a finger touch sensing period F.

In the case that the number of pens paired with the touch display device 100 is 1 (first pen), among the second to sixteenth touch time periods TP2 to TP16, the second and tenth touch time periods TP2 and TP10 can be allocated as a pen position and data sensing period P for the first pen, and the sixth touch time period TP6 can be allocated as a pen tilt sensing period T for the first pen, the third to fifth touch time periods TP3 to TP5, the seventh to ninth touch time periods TP7 to TP9 and the eleventh to thirteen touch time periods TP11 to TP13 can be allocated as a pen search period S to search for a new pen, and the fourteenth to sixteenth touch time periods TP14 to TP16 can be allocated as the finger touch sensing period F.

In the case that the number of pens paired with the touch display device 100 is 2 (first pen and second pen), among the second to sixteenth touch time periods TP2 to TP16, the second and tenth touch time periods TP2 and TP10 can be allocated as a pen position and data sensing period P for the first pen, the third and eleventh touch time periods TP3 and TP11 can be allocated as the pen position and data sensing period P for the second pen, and the sixth and seventh touch time periods TP6 and TP7 can be respectively allocated as pen tilt sensing periods T for the first and second pens, the fourth and fifth touch time periods TP4 and TP5, the eighth and ninth touch time periods TP8 and TP9, and the twelfth and thirteenth touch time periods TP12 and TP13 can be allocated as pen search periods S for searching for a new pen, and the fourteenth to sixteenth touch time periods TP14 to TP16 can be allocated as a finger touch sensing period F.

In the case that the number of pens paired with the touch display device 100 is 3 (first to third pens), among the second to sixteenth touch time periods TP2 to TP16, the second and tenth touch time periods TP2 and TP10 can be allocated as a pen position and data sensing period P for the first pen, the third and eleventh touch time periods TP3 and TP11 can be allocated as the pen position and data sensing period P for the second pen, the fourth and twelfth touch time periods TP4 and TP12 can be allocated as the pen position and data sensing period P for the third pen, the sixth to eighth touch time periods TP6 to TP8 can be respectively allocated as pen tilt sensing periods T for the first to third pens, the fifth touch time period TP5, the ninth touch time period TP9 and the thirteenth touch time period TP13 can be allocated as pen search periods S for searching for a new pen, and the fourteenth to sixteenth touch time periods TP14 to TP16 can be allocated as a finger touch sensing period F.

In the case that the number of pens paired with the touch display device 100 is 4 (first to fourth pens), among the second to sixteenth touch time periods TP2 to TP16, the second and tenth touch time periods TP2 and TP10 can be allocated as a pen position and data sensing period P for the first pen, the third and eleventh touch time periods TP3 and TP11 can be allocated as the pen position and data sensing period P for the second pen, the fourth and twelfth touch time periods TP4 and TP12 can be allocated as the pen position and data sensing period P for the third pen, the fifth and thirteenth touch time periods TP5 and TP13 can be allocated as the pen position and data sensing period P for the fourth pen, the sixth to ninth touch time periods TP6 to TP9 can be respectively allocated as pen tilt sensing periods T for the first to fourth pens, and the fourteenth to sixteenth touch time periods TP14 to TP16 can be allocated as a finger touch sensing period F.

Referring to FIG. 14, the touch display device 100 according to embodiments of the present disclosure can sense pen touch inputs by up to four pens. Sensing the pen touch input can include detecting the position of the pen, recognizing data including pen information, detecting a pen tilt, and the like.

In order for the touch display device 100 to sense a pen touch input for a pen, a pairing process with the pen is needed to be completed. When performing a pairing process with the pen, the touch display device 100 and the pen can exchange unique identification information with each other. In addition, during the pairing process, the touch display device 100 can reconfigure the touch time periods TP1 to TP16 in consideration of the number of pens to sense the pen touch input (i.e., the number of pens that have been paired).

The example of FIG. 14 is correspondent with a case in which the number of pens having been paired with the touch display device 100 is 0 in the first frame time FT1, the number of pens having been paired with the touch display device 100 is 1 in the second frame time FT2, the number of pens having been paired with the touch display device 100 is 2 in the third frame time FT3, the number of pens having been paired with the touch display device 100 is 3 in the fourth frame time FT4, and the number of pens having been paired with the touch display device 100 is 4 in the fifth frame time FT5.

In the first frame time FT1, it can be applied a frame configuration method corresponding to a case in which the number of pens that have been paired is 0. After a new first pen is searched and pairing process has been performed, in a second frame time FT2, it can be applied a frame configuration method corresponding to a case in which the number of pens that have been paired is 1. After a new second pen is searched and pairing process has been performed, in a third frame time FT3, it can be applied a frame configuration method corresponding to a case in which the number of pens that have been paired is 2. After a new third pen is searched and pairing process has been performed, in a fourth frame time FT4, it can be applied a frame configuration method corresponding to a case in which the number of pens that have been paired is 3. After a new fourth pen is searched and pairing process has been performed, in a fifth frame time FT5, it can be applied a frame configuration method corresponding to a case in which the number of pens that have been paired is 4.

Referring to FIG. 14, a type of a touch time period can be changed according to a change in the number of pens that have been paired. Therefore, during the touch time period in which the type is changed, the types of pen signals (first type, second type) applied to the touch panel TSP can be different before and after the number of pens that have been paired is changed.

In order to increase the pen search speed, all or part of the fourteenth to sixteenth touch time periods TP14 to TP16 can be not allocated to a finger touch sensing period F, but can be allocated as the pen search period S.

In the case that the fourteenth to sixteenth touch time periods TP14 to TP16 are allocated as the finger touch sensing period F, the touch driving signal TDS output from the touch driving circuit TDC can be applied to the touch panel TSP. During the touch time period allocated as the pen search period S among the fourteenth to sixteenth touch time periods TP14 to TP16, a first type of pen signal can be applied to at least one touch electrode.

Referring to FIG. 14, during touch time periods TP2 to TP16 different from the first touch time period TP1 of the first frame time FT1, the first type of pen signal can be applied to at least one touch electrode TE. Here, the first type of pen signal can be a periodic pulse signal.

Between the first frame time FT1 and the second frame time FT2, as the number of pens that have been paired is changed, the frame configuration method can be changed.

Accordingly, during one or more touch time periods (at least one of TP2 to TP16) different from the first touch time period TP1 of the second frame time FT2, i) a first type of pen signal can be applied to at least one touch electrode TE during the touch time periods TP3 to TP5, TP7 to TP9, and TP11 to TP13 allocated as the pen search period S, or ii) a second type of pen signal different from the first type can be applied to the at least one touch electrode TE during the touch time periods TP2 and TP10 allocated as the pen position and the data sensing period P, or iii) the touch driving signal TDS output from the touch sensing circuit TSC can be applied to at least one touch electrode TE during the touch time periods TP14 to TP16 allocated as the finger touch sensing period F.

Referring to FIG. 14, between a first frame time FT1 and a second frame time FT2, as the number of pens that have paired increases, one or more touch time periods TP2 and TP10 different from the first touch time period TP1 within the second frame time FT2 can be changed from the pen search period S to the pen position and data sensing period P.

Accordingly, during one or more touch time periods TP2 and TP10 different from the first touch time period TP1 within the second frame time FT2, a pen signal of a second type different from the first type can be applied to at least one touch electrode TE.

As described above, as at least one touch time period TP2 and TP10 different from the first touch time period TP1 within the second frame time FT2 is changed from the pen search period S to the pen position and data sensing period P, during at least one touch time period TP2 to TP10 different from the first touch time period TP1 within the second frame time FT2, when a pen signal of a second type different from the first type is applied to the at least one touch electrode TE, the touch sensing circuit TSC can supply the same DC voltage to the plurality of touch electrodes TE. For example, during the pen search period S, the touch sensing circuit TSC can DC drive the touch panel TSP.

During the other touch time periods TP2 and TP10 of the second frame time FT2, when a pen signal of the second type is output from a first pen that has already been paired and applied to at least one touch electrode TE, the touch sensing circuit TSC can recognize a position of the first pen, and can recognize data including pen information about the first pen, based on a second type of pen signal. Here, the pen that has already been paired is a pen for which pairing has been completed at a frame time before the second frame time FT2.

Referring to FIG. 14, between a first frame time FT1 and a second frame time FT2, as the number of paired pens increases, at least one touch time period TP14 to TP16 different from the first touch time period TP1 within the second frame time FT2 can be changed from the pen search period S to the finger touch sensing period F, or a finger touch sensing period F maybe maintained as it is.

Accordingly, during one or more touch time periods TP14 to TP16 different from the first touch time period TP1 within the second frame time FT2, the touch driving signal TDS output from the touch sensing circuit TSC can be applied to at least one touch electrode TE.

Referring to FIG. 14, during another touch time period TP14 to TP16 of the second frame time FT2, when the touch driving signal TDS output from the touch sensing circuit TSC is applied to at least one touch electrode TE, the touch sensing circuit TSC can sense the position of the finger touch based on a change in capacitance in the touch electrode TE to which the touch driving signal TDS is applied.

Referring to FIG. 14, between a first frame time FT1 and a second frame time FT2, even if the number of paired pens increases, one or more touch time periods TP3 to TP5, TP7 to TP9, TP11 to TP13 different from the first touch time period TP1 can be maintained as the pen search period S in order to additionally search for a new pen.

In this regard, during the first touch time period TP1 and at least one other touch time period TP3 to TP5, TP7 to TP9, TP11 to TP13 within the second frame time FT2, when a first type of pen signal is output from a new pen and applied to at least one touch electrode TE, the touch sensing circuit TSC can recognize the new pen based on the first type of pen signal and can perform a pairing process with the new pen.

The touch sensing circuit TSC can receive an ID from a new pen through least one touch electrode TE and transmit an ID hash value to the new pen through at least one touch electrode so as to perform the pairing process with the new pen Referring to FIG. 14, between a first frame time FT1 and a second frame time FT2, as the number of paired pens increases, one or more touch time periods TP6 different from the first touch time period TP1 within the second frame time FT2 can be changed from the pen search period S to the pen tilt sensing period T.

During another touch time period TP6 of the second frame time FT2, when the first type of pen signal is output from the first pen and applied to at least one touch electrode TE, the touch sensing circuit TSC can recognize a tilt of a pen that has already been paired, based on the first type of pen signal.

Figure 16:
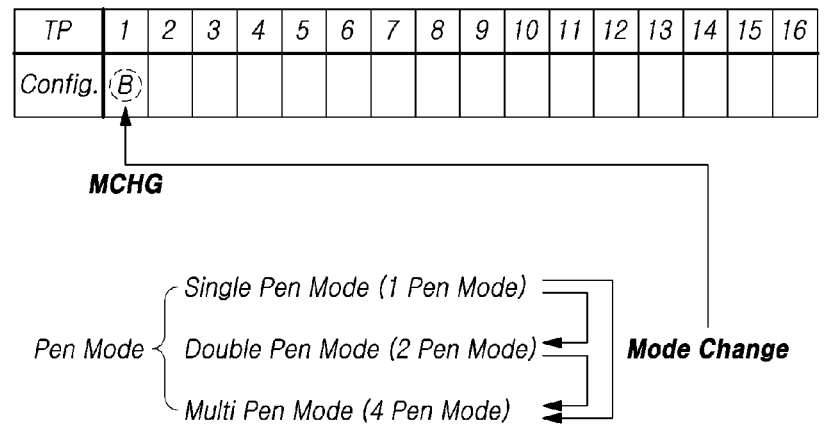
FIG. 16 is a diagram for explaining mode conversion in a pen protocol according to embodiments of the present disclosure.

FIG. 16 is a diagram for explaining mode conversion in a pen protocol according to embodiments of the present disclosure.

Referring to FIG. 16, the touch display device 100 according to embodiments of the present disclosure can change a frame configuration according to the number of pens that can be sensed. Accordingly, the touch display device 100 can provide a plurality of pen modes.

For example, the plurality of pen modes can include a single pen mode for sensing one pen, a double pen mode for sensing two pens, and a multi pen mode for sensing three or more pens.

Depending on the pen mode, there can be changed the configuration of the remaining touch time periods TP2 to TP16 excluding the touch time period TP1 allocated as the beacon transmission period B. Accordingly, when changing the pen mode, the touch display device 100 is needed to inform the already paired pan of the pen mode change fact and its contents through a beacon signal.

In the case that the beacon signal includes mode conversion information MCHG, the touch sensing circuit TSC can increase the number of pens that can be paired.

The touch sensing circuit TSC can change the type of one or more of the sixteen touch time periods TP1 to TP16 in order to increase the number of pens that can be paired.

Accordingly, in the touch time period in which the type is changed, i) a first type of pen signal can be applied to at least one touch electrode TE, or ii) a second type of pen signal different from the first type can be applied to at least one touch electrode TE, or iii) a touch driving signal TDS output from the touch sensing circuit TSC can be applied to at least one touch electrode TE.

The mode conversion information MCHG can be information for converting from one pen mode to another pen mode among a plurality of pen modes according to the number of pens that can be sensed during one touch frame time.

FIGS. 17 to 19 are diagrams illustrating an adaptive touch frame configuration for high-speed pen search for each of three pen modes in a pen protocol according to embodiments of the present disclosure.

Referring to FIG. 17, in a pen protocol according to embodiments of the present disclosure, it will be described an adaptive touch frame configuration for high-speed pen search in the multi-pen mode (four pen mode)

Referring to FIG. 17, the second to thirteenth touch time periods TP2 to TP13 among the remaining touch time periods TP2 to TP16 excluding the touch time period TP1 allocated as the beacon transmission period B are pen touch sensing periods, which are touch time periods that can be allocated as pen position and data sensing period P and pen tilt sensing period T, and the fourteenth to sixteenth touch time periods TP14 to TP16 are touch time periods that can be allocated as finger touch sensing period F.

Referring to FIG. 17, the multi-pen mode (four pen mode) is a pen mode that can be set when the number of pens that have been paired is 0, 1, 2, or 3.

Referring to FIG. 17, in the multi-pen mode (four pen mode), if the number of pens that have been paired is 0, the remaining touch time periods TP2 to TP16 excluding the touch time period TP1 allocated as the beacon transmission period B includes the second to thirteenth touch time periods TP2 to TP13 capable of being allocated as pen position and data sensing period P, and the fourteenth to sixteenth touch time periods TP14 to TP16 are touch time periods capable of being allocated as finger touch sensing period F.

The pen touch sensing periods P and T can include a pen position and data sensing period P, and a pen tilt sensing period F.

The twelve touch time periods TP2 to TP13 that can be allocated to the pen touch sensing periods P, T can be not allocated to the pen touch sensing periods P, T, but all can be allocated to the pen search period S.

The three touch time periods TP14 to TP16 that can be allocated as the finger touch sensing period F can be not allocated as the finger touch sensing period F, but can be all allocated as the pen search period S.

In the multi-pen mode (four pen mode), if the number of pens that have been paired is 0, the frame configuration can correspond to a pairing slot identification information 0000.

Referring to FIG. 17, in the multi-pen mode (four pen mode), if the number of pens that have been paired is 1, among the twelve touch time periods TP2 to TP13 that can be allocated as pen touch sensing periods P and T, three touch time periods can be allocated as pen touch sensing periods P and T, and the remaining nine touch time periods can be allocated as the pen search period S.

The three touch time periods TP14 to TP16 that can be allocated as the finger touch sensing period F can be not allocated as the finger touch sensing period F, but can all be allocated as the pen search period S.

There are four cases of three touch time periods allocated as pen touch sensing periods P and T, and according to these four cases, if the number of pens that have been paired in the multi-pen mode (four pen mode) is 1, the frame configuration can correspond to four types of pairing slot identification information 1000, 0100, 0010, and 0001.

Referring to FIG. 17, in the multi-pen mode (four pen mode), if the number of pens that have been paired is 2, among the twelve touch time periods TP2 to TP13 that can be allocated as pen touch sensing periods P and T, six touch time periods can be allocated as pen touch sensing periods P and T, and the remaining six touch time periods can be allocated as the pen search period S.

The three touch time periods TP14 to TP16 that can be allocated as the finger touch sensing period F can be not allocated as the finger touch sensing period F, but can all be allocated as the pen search period S.

There are six cases of six touch time periods allocated as pen touch sensing periods P and T, and according to these six cases, if the number of pens that have been paired in the multi-pen mode (four pen mode) is 2, the frame configuration can correspond to six types of pairing slot identification information 0011, 0101, 1001, 0110, 1010 and 1100.

Referring to FIG. 17, in the multi-pen mode (four pen mode), if the number of pens that have been paired is 4, among the twelve touch time periods TP2 to TP13 that can be allocated as pen touch sensing periods P and T, nine touch time periods can be allocated as pen touch sensing periods P and T, and the remaining three touch time periods can be allocated as the pen search period S.

The three touch time periods TP14 to TP16 that can be allocated as the finger touch sensing period F can be not allocated as the finger touch sensing period F, but can all be allocated as the pen search period S.

There are four cases of nine touch time periods allocated as pen touch sensing periods P and T, and according to these four cases, if the number of pens that have been paired in the multi-pen mode (four pen mode) is 4, the frame configuration can correspond to four types of pairing slot identification information 0111, 1011, 1101 and 1110.

Referring to FIG. 18, in double pen mode (two pen mode), if the number of pens that have been paired is 0, the remaining touch time periods TP2 to TP16 excluding the touch time period TP1 allocated as the beacon transmission period B include the twelve touch time periods TP2 to TP7, TP10 to TP15 that can be allocated to the pen touch sensing periods P and T, and the three touch time periods TP8, TP9 and TP 16 which can be allocated to the finger touch sensing period F.

The pen touch sensing periods P and T can include a pen position and data sensing period P, and a pen tilt sensing period F.

The twelve touch time periods TP2 to TP7, TP10 to TP15 capable of being allocated as pen touch sensing periods P and T can be not allocated as pen touch sensing periods P and T, and can be all allocated as the pen search period S.

The three touch time periods TP8, TP9 and TP16 capable of being allocated as the finger touch sensing period F can be not allotted as the finger touch sensing period F, but can be all allocated as the pen search period S.

In the double pen mode (two pen mode), if the number of pens that have been paired is 0, the frame configuration can correspond to the pairing slot identification information 0000.

Referring to FIG. 18, in the double pen mode (two pen mode), if the number of pens that have been paired is 1, among the twelve touch time periods TP2~TP7 and TP10~TP15 that can be allocated as pen touch sensing periods P and T, the seven touch time periods can be allocated as pen touch sensing periods P and T, and the remaining five touch time periods can be allocated as pen search period S.

The three touch time periods TP8, TP9 and TP16 capable of being allocated as the finger touch sensing period F can all be allocated as the pen search period S.

There are two cases of seven touch time periods allocated as pen touch sensing periods P and T, and according to these two cases, if the number of pens that have been paired in the double pen mode (two pen mode) is 1, the frame configuration can correspond to two types of pairing slot identification information 1000 and 0100.

Referring to FIG. 18, in the double pen mode (two pen mode), if the number of pens that have been paired is 2, among the twelve touch time periods TP2~TP7 and TP10~TP15 that can be allocated as pen touch sensing periods P and T, the ten touch time periods can be allocated as pen touch sensing periods P and T, and the remaining two touch time periods can be allocated as pen search period S.

The three touch time periods TP8, TP9 and TP16 capable of being allocated as the finger touch sensing period F can all be allocated as the pen search period S.

There is one case of the ten touch time periods allocated as pen touch sensing periods P and T, and according to this one case, if the number of pens that have been paired in the double pen mode (two pen mode) is 2, the frame configuration can correspond to the pairing slot identification information 1100.

Referring to FIG. 19, in the single pen mode (one pen mode), if the number of pens that have been paired is 0, the remaining touch time periods TP2 to TP16 excluding the touch time period TP1 allocated as the beacon transmission period B include the twelve touch time periods TP2~TP4, TP6~TP8, TP10~TP12 and TP14~TP16 that can be allocated to the pen touch sensing periods P and T, and the three touch time periods TP5, TP9 and TP 13 which can be allocated to the finger touch sensing period F.

The pen touch sensing periods P and T can include a pen position and data sensing period P, and a pen tilt sensing period F.

The twelve touch time periods TP2~TP4, TP6~TP8, TP10~TP12 and TP14~TP16 capable of being allocated as pen touch sensing periods P and T can be not allocated as pen touch sensing periods P and T, and can be all allocated as the pen search period S.

The three touch time periods TP5, TP9 and TP13 capable of being allocated as the finger touch sensing period F can be not allotted as the finger touch sensing period F, but can be all allocated as the pen search period S.

In the single pen mode (one pen mode), if the number of pens that have been paired is 0, the frame configuration can correspond to the pairing slot identification information 0000.

Referring to FIG. 19, in the single pen mode (one pen mode), if the number of pens that have been paired is 1, among the twelve touch time periods TP2~TP4, TP6~TP8, TP10~TP12 and TP14~TP16 that can be allocated as pen touch sensing periods P and T, the ten touch time periods can be allocated as pen touch sensing periods P and T, and the remaining two touch time periods can be allocated as pen search period S.

The three touch time periods TP5, TP9 and TP13 capable of being allocated as the finger touch sensing period F can all be allocated as the pen search period S.

There is one case of the ten touch time periods allocated as pen touch sensing periods P and T, and according to this one case, if the number of pens that have been paired in the single pen mode (one pen mode) is 1, the frame configuration can correspond to a type of the pairing slot identification information 1000.

Figure 21:
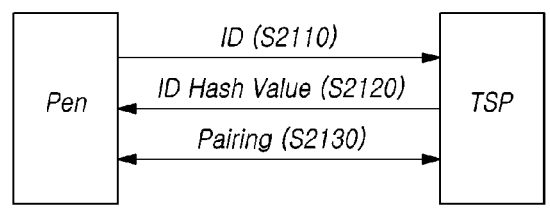
FIG. 21 illustrates a pairing operation between a touch display device and a pen in a pen protocol according to embodiments of the present disclosure.

FIGS. 20A and 20B are diagrams for explaining an operation of an unpaired pen and a quick pairing operation with respect to a beacon signal including mode conversion information MCHG in a pen protocol according to embodiments of the present disclosure. FIG. 21 illustrates a pairing operation between a touch display device 100 and a pen in a pen protocol according to embodiments of the present disclosure.

Referring to FIGS. 20A and 20B, in the case that the beacon signal includes mode conversion information MCHG, the touch sensing circuit TSC can receive a pen signal including an ID from a pen that is not paired with the touch display device 100 through at least one of the touch electrodes TE.

Referring to FIG. 20A, when the mode is changed from the single pen mode (one pen mode) to the double pen mode (two pen mode), during the touch time period TP1 allocated as the beacon transmission period B, The touch driving circuit TDC outputs a beacon signal including the mode change information MCHG to the touch panel TSP.

Accordingly, the pen for which the pairing has been completed can receive the beacon signal including mode change information MCHG through the touch panel TSP.

In addition, a new pen that has not been paired can also newly access the touch panel TSP and receive a beacon signal including mode change information MCHG through the touch panel TSP.

After the new pen that has not been paired newly accesses the touch panel TSP and receives a beacon signal including mode change information MCHG, the new pen may not perform a mute operation, but can transmit its own ID (S2110).

Thus, after receiving the ID from the new pen that has not been paired, the touch sensing circuit TSC can transmit an ID hash value to the unpaired pen (S2120). Accordingly, the touch display device 100 and the new pen are paired (S2130).

Referring to FIG. 20B, in the case that the mode is changed from single pen mode (one pen mode) to multi-pen mode (four pen mode), or from double pen mode (two pen mode) to multi-pen mode (four pen mode), during the touch time period TP1 allocated as the beacon transmission period B, the touch driving circuit TDC outputs a beacon signal including the mode change information MCHG to the touch panel TSP.

As such, the pen on which the pairing has been completed can receive the beacon signal including mode change information MCHG through the touch panel TSP.

In addition, a new pen that has not been paired can also newly access the touch panel TSP and receive a beacon signal including mode change information MCHG through the touch panel TSP.

After the new pen that has not been paired newly accesses the touch panel TSP and receives a beacon signal including mode change information MCHG, the new pen may not perform a mute operation, but can transmit its own ID (S2110).

Accordingly, after receiving the ID from the new pen that has not been paired, the touch sensing circuit TSC can transmit an ID hash value to the unpaired pen (S2120). Accordingly, the touch display device 100 and the new pen are paired (S2130).

FIGS. 22A, 22B, 22C, and 22D are diagrams for explaining the effect of shortening the pairing time according to the pen protocol according to embodiments of the present disclosure.

Figure 22A:
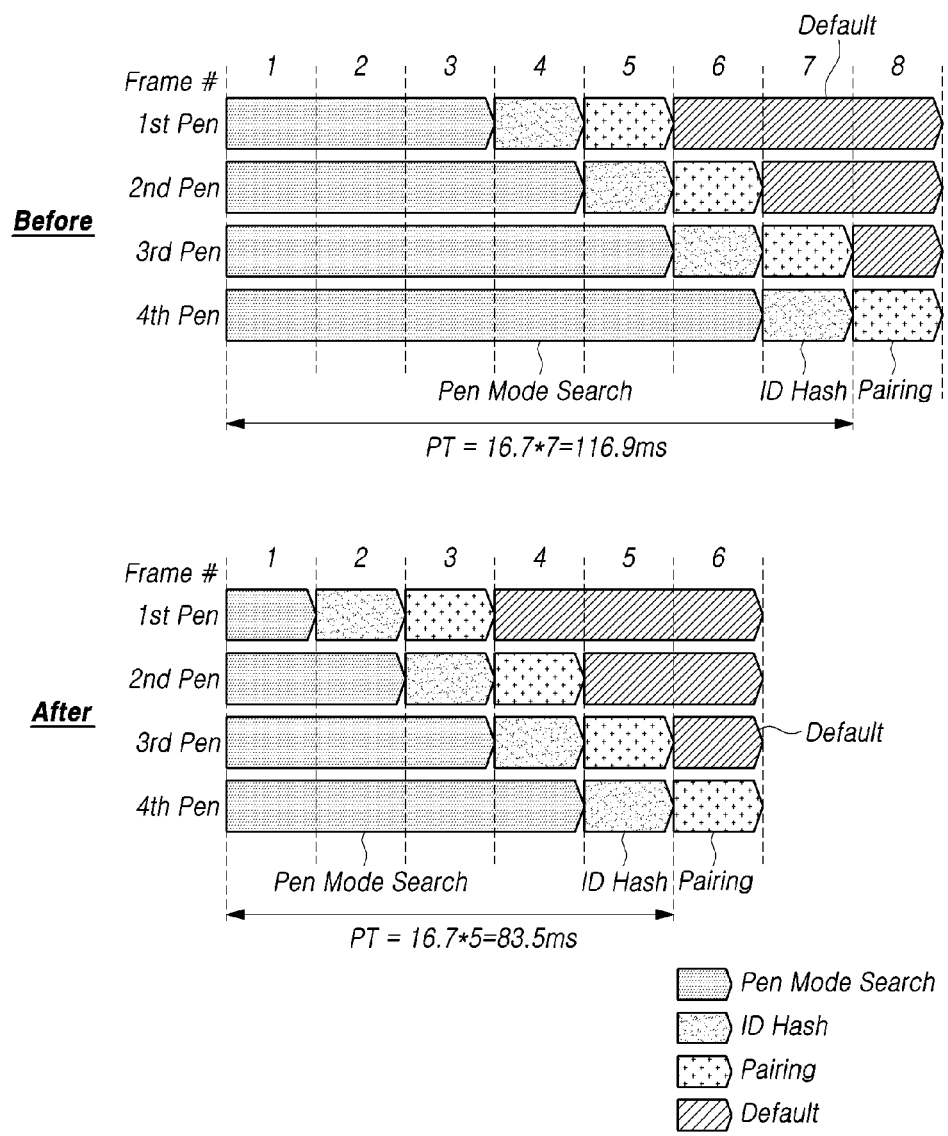

With reference to FIG. 22A, it will be described, in the case where the pen mode is fixed in the multi-pen mode (four pen mode) (Case 1), the effect of reducing the pairing time PT according to the number of pens.

Referring to FIG. 22A, before the application of the present disclosure, a first pen, a second pen, a third pen, and a fourth pen are sequentially searched, and an ID hash value transmission and pairing completion process are sequentially completed. The pairing time PT for a total of four pens to complete pairing corresponds to seven frame times (7*16.7=116.9 ms).

Referring to FIG. 22A, if the mode is fixed as the multi-pen mode (four pen mode) according to embodiments of the present disclosure, the first pen, the second pen, the third pen and the fourth pen are sequentially searched, and the ID hash value transmission and pairing process are sequentially completed.

If the present disclosure is applied, according to a feature (see FIG. 12) of driving and sensing four multiplexing driving groups in one touch time period and a feature (see FIGS. 14 and 17-19) of changing the frame configuration in which the touch time periods allocated to at least one of the pen position and data sensing period P, the pen tilt sensing period T and the finger touch sensing period F to be allotted as the pen search period S, the new first to fourth pens can be searched at an earlier time. Accordingly, the pairing time PT for a total of four pens to complete pairing corresponds to five frame times (5*16.7=83.5 ms).

If the embodiments of the present disclosure are applied, it can be seen that the pairing time PT is considerably shortened in the multi-pen mode (four pen mode).

As shown in FIG. 12, this shortening effect can be achieved by a feature (see FIG. 12) of driving and sensing four multiplexing driving groups in one touch time period and a feature (see FIGS. 14 and 17-19) of changing the frame configuration in which the touch time periods allocated to at least one of the pen position and data sensing period P, the pen tilt sensing period T and the finger touch sensing period F to be allotted as the pen search period S.

Figure 22B:
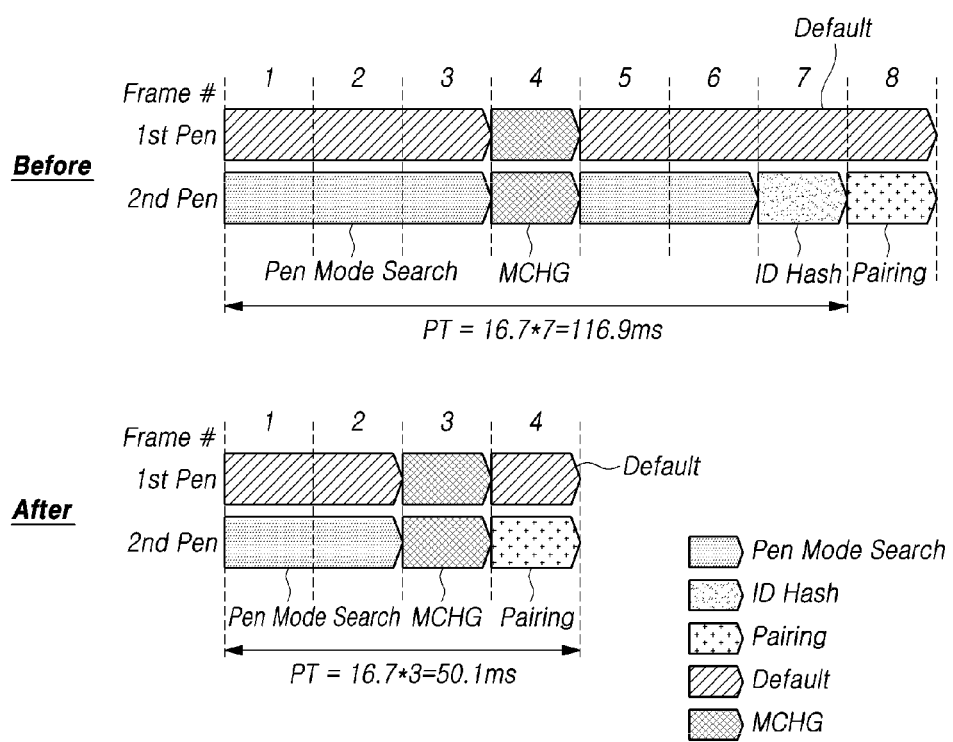

With reference to FIG. 22B, it will be described, in the case that the single pen mode (one pen mode) is changed to the double pen mode (two pen mode) (Case 2), the effect of shortening the pairing time PT while increasing the number of pens.

Referring to FIG. 22B, before the application of the present disclosure, after the mode is changed from single pen mode (one pen mode) to double pen mode (two pen mode) in a state in which the first pen has been paired, the second pen is searched, and the ID hash value transmission and pairing process are sequentially completed.

After the mode is changed from single pen mode (one pen mode) to double pen mode (two pen mode), the pairing time PT needed to complete the pairing of the second pen corresponds to seven frame times (7*16.7 =116.9 ms).

Referring to FIG. 22B, if the present disclosure is applied, after the mode is changed from single pen mode (one pen mode) to double pen mode (two pen mode) in a state in which the first pen has been paired, the second pen is searched, and the ID hash value transmission and pairing process are sequentially completed.

If the present disclosure is applied, according to a feature (see FIG. 12) of driving and sensing four multiplexing driving groups in one touch time period and a feature (see FIGS. 14 and 17-19) of changing the frame configuration in which the touch time periods allocated to at least one of the pen position and data sensing period P, the pen tilt sensing period T and the finger touch sensing period F to be allotted as the pen search period S, the new second pen can be searched at an earlier time.

If the present disclosure is applied, when an unpaired second pen receives a beacon signal including mode change information MCHG in the third frame #3, the unpaired second pen transmits an ID in the third frame #3 without delaying to the frame #4, and the touch display device 100 also transmits the ID hash value in the third frame #3 without delaying to the next fourth frame #4 so as to complete the pairing.

Therefore, after the mode is changed from single pen mode (one pen mode) to double pen mode (two pen mode), the pairing time PT needed to complete pairing of the second pen corresponds to three frame times (3*16.7=50.1 ms).

If the embodiments of the present disclosure are applied, it can be seen that the pairing time PT is considerably shortened in the case that the mode is changed from single pen mode (one pen mode) to double pen mode (two pen mode) (Case 2).

Returning to FIG. 12, this shortening effect can be achieved by a feature (see FIG. 12) of driving and sensing four multiplexing driving groups in one touch time period, a feature (see FIGS. 14 and 17-19) of changing the frame configuration in which the touch time periods allocated to at least one of the pen position and data sensing period P, the pen tilt sensing period T and the finger touch sensing period F to be allotted as the pen search period S, and a feature (see FIG. 20A, FIG. 20B) in which the unpaired pen performs the ID transmission process when receives the beacon signal including the mode conversion information MCHG.

With reference to FIG. 22C, it will be described, in the case that the single pen mode (one pen mode) is changed to the multi-pen mode (four pen mode) (Case 3), the effect of shortening the pairing time PT while increasing the number of pens.

Referring to FIG. 22C, before the application of the present disclosure, after the mode is changed from single pen mode (one pen mode) to multi-pen mode (four pen mode) in a state in which the first pen has been paired, a second pen, a third pen and a fourth pen are searched, and the ID hash value transmission and pairing process are sequentially completed.

After the mode is changed from single pen mode (one pen mode) to multi-pen mode (four pen mode), the pairing time PT needed to complete the pairing of the second pen to the fourth pens corresponds to nine frame times (9*16.7=150.3 ms).

Referring to FIG. 22C, if the present disclosure is applied, after the mode is changed from single pen mode (one pen mode) to multi-pen mode (four pen mode) in a state in which the first pen has been paired, the second pen, the third pen and the fourth pen are searched, and the ID hash value transmission and pairing process therefor are sequentially completed.

If the present disclosure is applied, according to a feature (see FIG. 12) of driving and sensing four multiplexing driving groups in one touch time period and a feature (see FIGS. 14 and 17-19) of changing the frame configuration in which the touch time periods allocated to at least one of the pen position and data sensing period P, the pen tilt sensing period T and the finger touch sensing period F to be allotted as the pen search period S, the new second to fourth pens can be searched at an earlier time.

If the present disclosure is applied, when an unpaired second pen receives a beacon signal including mode change information MCHG in the third frame #3, the unpaired second pen transmits an ID in the third frame #3 without delaying to the frame #4, and the touch display device 100 also transmits the ID hash value in the third frame #3 without delaying to the next fourth frame #4 so as to complete the pairing.

Therefore, after the mode is changed from single pen mode (one pen mode) to multi-pen mode (four pen mode), the pairing time PT needed to complete pairing of the second to fourth pens corresponds to five frame times (5*16.7=83.5 ms).

If the embodiments of the present disclosure are applied, it can be seen that the pairing time PT is considerably shortened in the case that the mode is changed from single pen mode (one pen mode) to multi-pen mode (four pen mode) (Case 3).

As shown in FIG. 12, this shortening effect can be achieved by a feature (see FIG. 12) of driving and sensing four multiplexing driving groups in one touch time period, a feature (see FIGS. 14 and 17-19) of changing the frame configuration in which the touch time periods allocated to at least one of the pen position and data sensing period P, the pen tilt sensing period T and the finger touch sensing period F to be allotted as the pen search period S, and a feature (see FIG. 20A, FIG. 20B) in which the unpaired pen performs the ID transmission process when receives the beacon signal including the mode conversion information MCHG.

With reference to FIG. 22D, it will be described, in the case that the double pen mode (two pen mode) is changed to the multi-pen mode (four pen mode) (Case 4), the effect of shortening the pairing time PT while increasing the number of pens.

Referring to FIG. 22D, before the application of the present disclosure, after the mode is changed from double pen mode (two pen mode) to multi-pen mode (four pen mode) in a state in which the first pen and the second pen have been paired, a third pen and a fourth pen are searched, and the ID hash value transmission and pairing process are sequentially completed.

After the mode is changed from double pen mode (two pen mode) to multi-pen mode (four pen mode), the pairing time PT needed to complete the pairing of the third pen and the fourth pen corresponds to eight frame times (8*16.7=133.6 ms).

Referring to FIG. 22D, if the present disclosure is applied, after the mode is changed from double pen mode (two pen mode) to multi-pen mode (four pen mode) in a state in which the first pen and the second pen have been paired, the third pen and the fourth pen are searched, and the ID hash value transmission and pairing process therefor are sequentially completed.

If the present disclosure is applied, according to a feature (see FIG. 12) of driving and sensing four multiplexing driving groups in one touch time period and a feature (see FIGS. 14 and 17-19) of changing the frame configuration in which the touch time periods allocated to at least one of the pen position and data sensing period P, the pen tilt sensing period T and the finger touch sensing period F to be allotted as the pen search period S, the new third pen and the fourth pens can be searched at an earlier time.

If the present disclosure is applied, when an unpaired third pen receives a beacon signal including mode change information MCHG in the third frame #3, the unpaired third pen transmits an ID in the third frame #3 without delaying to the frame #4, and the touch display device 100 also transmits the ID hash value in the third frame #3 without delaying to the next fourth frame #4 so as to complete the pairing.

Therefore, after the mode is changed from double pen mode (two pen mode) to multi-pen mode (four pen mode), the pairing time PT needed to complete pairing of the third pen and the fourth pen corresponds to four frame times (4*16.7=66.8 ms).

If the embodiments of the present disclosure are applied, it can be seen that the pairing time PT is considerably shortened in the case that the mode is changed from double pen mode (two pen mode) to multi-pen mode (four pen mode) (Case 4).

As shown in FIG. 12, this shortening effect can be achieved by a feature (see FIG. 12) of driving and sensing four multiplexing driving groups in one touch time period, a feature (see FIGS. 14 and 17-19) of changing the frame configuration in which the touch time periods allocated to at least one of the pen position and data sensing period P, the pen tilt sensing period T and the finger touch sensing period F to be allotted as the pen search period S, and a feature (see FIG. 20A, FIG. 20B) in which the unpaired pen performs the ID transmission process when receives the beacon signal including the mode conversion information MCHG.

Figure 23:
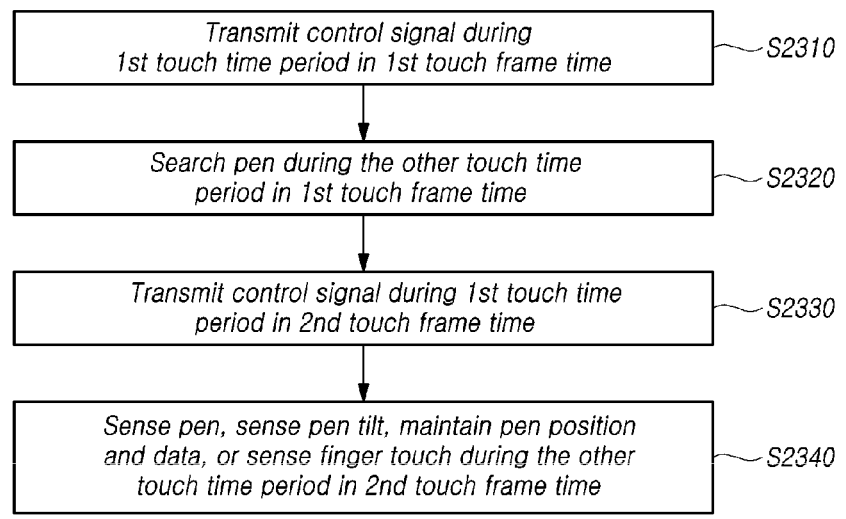
FIG. 23 is a flowchart of a touch sensing method according to embodiments of the present disclosure.

FIG. 23 is a flowchart of a touch sensing method according to embodiments of the present disclosure.

Referring to FIG. 23, a touch sensing method of the touch display device 100 according to embodiments of the present disclosure can include a step S2310 in which the touch sensing circuit TSC supplies a control signal to the plurality of touch electrodes TE during a first touch time period TP1 within a first frame time FT1, a step S2320 in which the touch sensing circuit TSC receives a first type of pen signal applied to at least one of the plurality of touch electrodes TE during another touch time period (one of TP2 to TP16) different from the first touch time period TP1 within the first frame time FT1, a step S2330 in which the touch sensing circuit TSC supplies a control signal to the plurality of touch electrodes TE during a first touch time period TP1 within a second frame time FT2, and a step S2340 in which, during a touch time period (one of TP2 to TP16) different from the first touch time period TP1 within the second frame time FT2, the touch sensing circuit TSC receives a first type of pen signal applied to at least one of the plurality of touch electrodes TE, or receives a second type of pen signal applied to at least one of the plurality of touch electrodes TE, or supplies a touch driving signal TDS to at least one of the plurality of touch electrodes TE.

Here, the first type of pen signal can be a periodic pulse signal. The second type of pen signal can be a non-periodic and information-expressed pulse signal.

Between the first frame time and the second frame time, as the number of pens that have been paired increases, a touch time period different from the first touch time period TP1 within the second frame time can be changed from the pen search period S to the pen position and data sensing period P or the finger touch sensing period F.

Accordingly, during a touch time period different from the first touch time period TP1 within the second frame time, a second type of pen signal different from the first type can be applied to at least one touch electrode TE, or the touch driving signal TDS output from the touch sensing circuit TSC can be applied to at least one touch electrode TE.

The embodiments of the present disclosure described above can be briefly summarized as follows.

A touch display device according to embodiments of the present disclosure can include a plurality of gate lines, a plurality of data lines, and a plurality of subpixels on a substrate, and a touch electrode which is disposed on the substrate, and to which a beacon signal, a constant voltage signal, and a touch driving signal for detecting a finger touch are applied at different timings during one frame time.

In the touch display device according to embodiments of the present disclosure, a period in which the constant voltage signal is applied can include a pen-related period including at least one of a pen position and data sensing period for sensing a pen position and pen information based on a pen signal applied to the touch electrode from the outside, and a pen tilt sensing period for sensing a pen tilt based on the pen signal.

In the touch display device according to embodiments of the present disclosure, the remaining periods excluding the pen-related period among the periods in which the constant voltage signal is applied can be allocated as a pen search period for searching for a new pen until a preset maximum pen pairing number (e.g., 1, 2, 4 6, 8, etc.).

In the touch display device according to embodiments of the present disclosure, the beacon signal can be a signal whose voltage level changes non-periodically, and the touch driving signal can be a signal whose voltage level changes periodically.

In the touch display device according to embodiments of the present disclosure, when the number of pens which have been paired increases, a time length occupied by the pen-related period in the one frame time can increase and a time length occupied by the pen search period in the one frame time can decrease.

According to the embodiments of the present disclosure described above, it is possible to provide a touch display device 100 and a touch sensing method capable of high-speed pen search.

According to the embodiments of the present disclosure described above, it is possible to provide a touch display device 100 and a touch sensing method capable of high-speed pen pairing.

According to the embodiments of the present disclosure described above, it is possible to provide a touch display device 100 and a touch sensing method capable of reconfiguring the frame by changing the type of all or part of the plurality of touch time periods TP1 to TP16 in the frame based on the number of paired pens.

According to the embodiments of the present disclosure described above, it is possible to provide a touch display device 100 and a touch sensing method designed with a highly scalable pen protocol to flexibly change the pen mode.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. For example, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A touch display device comprising:
    a touch sensor including a plurality of touch electrodes; and
    a touch sensing circuit configured to sense the plurality of touch electrodes during a first frame time and sense the plurality of touch electrodes during a second frame time different from the first frame time,
    wherein each of the first frame time and the second frame time includes m touch time periods, and m is a natural number greater than or equal to 2,
    wherein, during a first touch time period of the first frame time or the second frame time, the touch sensing circuit is configured to supply a beacon signal to the plurality of touch electrodes,
    wherein a first type of pen signal is applied to at least one touch electrode during the other touch time period different from the first touch time period within the first frame time,
    wherein a type of the other touch time period within the second frame time is changed according to a change in the number of pens which have been paired between the first frame time and the second frame time, and
    wherein, during the other touch time period with changed type within the second frame time, the first type of pen signal is applied to at least one touch electrode, or a second type of pen signal different from the first type of pen signal is applied to at least one touch electrode, or a touch driving signal output from the touch sensing circuit is applied to at least one touch electrode.

2. The touch display device of claim 1, wherein, as the number of pens which have been paired between the first frame time and the second frame time increases, the type of the other touch time period within the second frame time are changed, and wherein, during the other touch time period with the changed type within the second frame time, the second type of pen signal different from the first type of pen signal is applied to at least one touch electrode, or the touch driving signal output from the touch sensing circuit is applied to at least one touch electrode.

3. The touch display device of claim 1, wherein, during the other touch time period with the changed type within the second frame time, when the second type of pen signal is applied to at least one touch electrode, the touch sensing circuit supplies a same DC voltage to the plurality of touch electrodes.

4. The touch display device of claim 1, wherein the first type of pen signal is a periodic pulse signal, and the second type of pen signal is a non-periodic and information-expressed pulse signal.

5. The touch display device of claim 1, wherein, when the first type of pen signal is output from a new pen and applied to at least one touch electrode, the touch sensing circuit is configured to recognize the new pen based on the first type of pen signal and perform a pairing process with the new pen.

6. The touch display device of claim 5, wherein the touch sensing circuit is configured to perform the pairing process with the new pen, by receiving an ID from the new pen through at least one touch electrode and transmitting an ID hash value to the new pen through at least one touch electrode.

7. The touch display device of claim 1, wherein, during the other touch time period with the changed type within the second frame time, when the first type of pen signal is output from a pen that has already been paired and is applied to at least one touch electrode, the touch sensing circuit is configured to recognize a tilt of the pen based on the first type of pen signal.

8. The touch display device of claim 1, wherein, during the other touch time period with the changed type within the second frame time, when the second type of pen signal is output from a pen and applied to at least one touch electrode, the touch sensing circuit is configured to recognize a position of the pen and recognize data including pen information about the pen based on the second type of pen signal.

9. The touch display device of claim 8, wherein, in a frame time prior to the second frame time, the pen is a pen that has been paired.

10. The touch display device of claim 1, wherein, during the other touch time period with the changed type within the second frame time, when the touch driving signal output from the touch sensing circuit is applied to at least one touch electrode, the touch sensing circuit is configured to detect a position of a finger touch based on a change in capacitance in the touch electrode to which the touch driving signal is applied.

11. The touch display device of claim 1, wherein the touch sensing circuit is configured to select a plurality of multiplexing driving groups including a plurality of touch electrodes, and simultaneously drive the plurality of touch electrodes included in the selected multiplexing driving group, and wherein the touch sensing circuit is configured to drive touch electrodes included in at least four multiplexing driving groups among the plurality of multiplexing driving groups for all or part of the m touch time periods.

12. The touch display device of claim 1, wherein, during the first touch time period of each of the first frame time and the second frame time, the touch sensing circuit is configured to supply the beacon signal as a signal of the same type to the plurality of touch electrodes.

13. The touch display device of claim 12, wherein, in a case that the beacon signal includes mode conversion information, during a frame time in which the beacon signal is transmitted, the touch sensing circuit is configured to receive a pen signal including an ID from a pen that is not paired with the touch display device through at least one of the touch electrodes, and transmit an ID hash value to the pen.

14. The touch display device of claim 13, wherein the mode conversion information is information for converting from one pen mode to another pen mode among a plurality of pen modes according to the number of pens that can be sensed during one touch frame time, and the plurality of pen modes include a single pen mode for sensing one pen, a double pen mode for sensing two pens, and a multi pen mode for sensing three or more pens.

15. The touch display device of claim 12, wherein, in a case that the beacon signal includes mode conversion information, the touch sensing circuit is configured to increase the number of pens that can be paired.

16. The touch display device of claim 15, wherein the touch sensing circuit is configured to change the type of one or more touch time periods among the m touch time periods in order to increase the number of pens that can be paired, and wherein, during the touch time period with changed type, the first type of pen signal is applied to at least one touch electrode, the second type of pen signal different from the first type of pen signal is applied to at least one touch electrode, or the touch driving signal output from the touch sensing circuit is applied to at least one touch electrode.

17. The touch display device of claim 1, further comprising:

a display panel including the touch sensor embedded therein, and including a plurality of data lines and a plurality of gate lines;

a data driving circuit configured to supply data signals for image display to the plurality of data lines during a non-touch time period between two touch time periods; and a gate driving circuit configured to supply a scan signal to at least one of the plurality of gate lines during the non-touch time period between two touch time periods.

18. A touch sensing method of a touch display device, the touch sensing method comprising:

supplying, by a touch sensing circuit, a control signal to a plurality of touch electrodes during a first touch time period within a first frame time;

receiving, by the touch sensing circuit, a first type of pen signal applied to at least one of the plurality of touch electrodes during the other touch time period different from the first touch time period within the first frame time;

supplying, by the touch sensing circuit, a control signal to the plurality of touch electrodes during a first touch time period within a second frame time; and receiving, by the touch sensing circuit, during the other touch time period different from the first touch time period within the second frame time, the first type of pen signal applied to at least one of the plurality of touch electrodes, or receiving a second type of pen signal applied to at least one of the plurality of touch electrodes, or supplying a touch driving signal to at least one of the plurality of touch electrodes.

19. The touch sensing method of claim 18, wherein, as the number of pens which have been paired between the first frame time and the second frame time increases, the type of the first touch time period and the other touch time period within the second frame time is changed, and wherein, during the other touch time period with the changed type within the second frame time, the second type of pen signal different from the first type of pen signal is applied to at least one touch electrode, or the touch driving signal output from the touch sensing circuit is applied to at least one touch electrode.

20. The touch sensing method of claim 18, wherein the first type of pen signal is a periodic pulse signal, and the second type of pen signal is a non-periodic and information-expressed pulse signal.

21. A touch display device comprising:
a plurality of gate lines, a plurality of data lines, and a plurality of subpixels on a substrate; and
a touch electrode which is disposed on the substrate, and to which a beacon signal, a constant voltage signal, and a touch driving signal for detecting a finger touch are applied at different timings during one frame time, wherein a period in which the constant voltage signal is applied includes a pen-related period including at least one of:
a pen position and data sensing period for sensing a pen position and pen information based on a pen signal applied to the touch electrode from the outside, and
a pen tilt sensing period for sensing a pen tilt based on the pen signal, and wherein remaining periods excluding the pen-related period among the periods in which the constant voltage signal is applied are allocated as a pen search period for searching for a new pen until a preset maximum pen pairing number.

22. The touch display device of claim 21, wherein the beacon signal is a signal whose voltage level changes non-periodically, and the touch driving signal is a signal whose voltage level changes periodically.

23. The touch display device of claim 21, wherein, when the number of pens which have been paired increases, a time length occupied by the pen-related period in the one frame time increases and a time length occupied by the pen search period in the one frame time decreases.

* * * * *